(12) United States Patent
Chakraborty et al.

(10) Patent No.: US 11,575,460 B2
(45) Date of Patent: Feb. 7, 2023

(54) ADAPTIVE RADIO CONFIGURATION IN WIRELESS NETWORKS

(71) Applicant: Microsoft Technology Licensing, LLC, Redmond, WA (US)

(72) Inventors: Tusher Chakraborty, Karnataka (IN); Zerina Kapetanovic, Seattle, WA (US); Deepak Vasisht, Redmond, WA (US); Ranveer Chandra, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 247 days.

(21) Appl. No.: 16/936,144

(22) Filed: Jul. 22, 2020

(65) Prior Publication Data

US 2021/0367701 A1 Nov. 25, 2021

(30) Foreign Application Priority Data

May 21, 2020 (IN) .............................. 202041021481

(51) Int. Cl.
*H04L 1/00* (2006.01)
*G06N 3/04* (2006.01)
*G06N 3/08* (2006.01)

(52) U.S. Cl.
CPC ......... *H04L 1/0002* (2013.01); *G06N 3/0454* (2013.01); *G06N 3/08* (2013.01); *H04L 1/0038* (2013.01)

(58) Field of Classification Search
CPC ..... H04L 1/0002; H04L 1/0038; H04L 69/16; H04L 9/40; H04L 1/08; G06N 3/0454; G06N 3/08
See application file for complete search history.

(56) References Cited

U.S. PATENT DOCUMENTS

| 7,505,528 | B2 * | 3/2009 | Morris | H04L 1/0009 |
| | | | | 375/285 |
| 7,567,576 | B2 * | 7/2009 | Murphy | H04L 65/70 |
| | | | | 709/224 |
| 10,142,257 | B2 * | 11/2018 | Alicherry | G06F 11/0751 |
| 2012/0163480 | A1 | 6/2012 | Nemeth et al. | |
| 2022/0155773 | A1 * | 5/2022 | Kulshreshtha | G05B 23/0283 |

OTHER PUBLICATIONS

"An End-to-End Open Source Machine Learning Platform", Retrieved from: https://www.tensorflow.org/, Retrieved on Apr. 1, 2020, 10 Pages.
"LoRa Modulation Basics", Retrieved from: https://semtech.my.salesforce.com/sfc/p/#E0000000JelG/a/2R0000001OJa/2BF2MTeiqlwkmxkcjjDZzalPUGIJ76ILdqiv.30prH8, May 2015, 26 Pages.

(Continued)

*Primary Examiner* — Chandrahas B Patel
(74) *Attorney, Agent, or Firm* — Alleman Hall Creasman & Tuttle LLP

(57) ABSTRACT

A wireless networking system is provided. The wireless networking system includes a base station device including processing circuitry configured to detect a transmission rate from a portion of a preamble of an incoming packet transmission signal and adapt a radio configuration to receive a remainder of the incoming packet transmission signal at the transmission rate.

18 Claims, 19 Drawing Sheets

(56) References Cited

OTHER PUBLICATIONS

"About GNU Radio", Retrieved from: https://web.archive.org/web/20160728021217/https://www.gnuradio.org/about/, Jul. 28, 2016, 1 Page.

"Semtech SX1276", Retrieved From: https://web.archive.org/web/20200606031627/https://www.semtech.com/products/wireless-rf/lora-transceivers/sx1276, Jun. 6, 2020, 4 Pages.

"STM32L151/152", Retrieved from: https://web.archive.org/web/20190410124332/https://www.st.com/en/microcontrollers-microprocessors/stm32l151-152.html, Apr. 10, 2019, 3 Pages.

Abdelfadeel, et al., "Fair Adaptive Data Rate Allocation and Power Control in LoRaWan", In Proceedings of the IEEE 19th International Symposium on A World of Wireless, Mobile and Multimedia Networks, Jun. 12, 2018, 9 Pages.

Abdelfadeel, et al., "FREE—Fine-Grained Scheduling for Reliable and Energy Efficient Data Collection in LoRaWAN", In IEEE Internet of Things Journal, vol. 7, Issue 1, Oct. 28, 2019, 16 Pages.

Bicket, John C., "Bit-Rate Selection in Wireless Networks", In Thesis of Massachusetts Institute of Technology, Feb. 2005, 50 Pages.

Bor, et al., "LoRa Transmission Parameter Selection", In Proceedings of the 13th International Conference on Distributed Computing in Sensor Systems, Jun. 5, 2017, 8 Pages.

Camp, et al., "Modulation Rate Adaptation in Urban and Vehicular Environments: Cross-Layer Implementation and Experimental Evaluation", In ACM Transactions on MobiCom, Sep. 14, 2008, pp. 315-326.

Chen, et al., "Cognitive-LPWAN: Towards Intelligent Wireless Services in Hybrid Low Power Wide Area Networks", In IEEE Transactions on Green Communications and Networking, vol. 3, Issue 2, Oct. 3, 2018, 9 Pages.

Duomo, et al., "EXPLoRa: Extending the Performance of LoRa by Suitable Spreading Factor Allocations", In Proceedings of the IEEE 13th International Conference on Wireless and Mobile Computing, Networking and Communications, Oct. 9, 2017, 8 Pages.

Cuomo, et al., "Towards Traffic-Oriented Spreading Factor Allocations in LoRaWAN Systems", In Proceedings of the 17th Annual Mediterranean Ad Hoc Networking Workshop, Jun. 20, 2018, 9 Pages.

Dongare, et al., "Charm: Exploiting Geographical Diversity through Coherent Combining in Low-Power Wide-Area Networks", In Proceedings of the 17th ACM/IEEE International Conference on Information Processing in Sensor Networks, Apr. 11, 2018, pp. 60-71.

Eletreby, et al., "Empowering Low-Power Wide Area Networks in Urban Settings", In Proceedings of the Conference of the ACM Special Interest Group on Data Communication, Aug. 21, 2017, pp. 309-321.

Gadre, et al., "Frequency Configuration for Low-Power Wide-Area Networks in a Heartbeat", In Proceedings of the 17th USENIX Symposium on Networked Systems Design and Implementation, Feb. 25, 2020, 14 Pages.

Gao, et al., "Blind Distributed MU-MIMO for IoT Networking Over VHF Narrowband Spectrum", In Proceedings of the 25th Annual International Conference on Mobile Computing and Networking, Oct. 21, 2019, 17 Pages.

Gudipati, et al., "Automatic Rate Adaptation", In Proceedings of the 9th ACM SIGCOMM Workshop on Hot Topics in Networks, Oct. 20, 2010, 6 Pages.

Haxhibeqiri, et al., "Low Overhead Scheduling of LoRa Transmissions for Improved Scalability", In IEEE Internet of Things Journal, vol. 6, Issue 2, Oct. 31, 2018, 14 Pages.

Holland, et al., "A Rate-Adaptive MAC Protocol for Multi-Hop Wireless Networks", In Proceedings of the 7th annual International conference on Mobile Computing and Networking, Jul. 16, 2001, pp. 236-250.

Ioffe, et al., "Batch Normalization: Accelerating Deep Network Training by Reducing Internal Covariate Shift", In Repository of arXiv:1502.03167, Feb. 11, 2015, 11 Pages.

Kingma, et al., "Adam: A Method for Stochastic Optimization", In Repository of arXiv:1412.6980v1, Dec. 22, 2014, 9 Pages.

Reynders, et al., "Improving Reliability and Scalability of LoRaWANs Through Lightweight Scheduling", In IEEE Internet of Things Journal, vol. 5, Issue 3, Jun. 2018, pp. 1830-1842.

Shahid, et al., "A Convolutional Neural Network Approach for Classification of LPWAN Technologies: Sigfox, LoRa and IEEE 802.15.4g", In Proceedings of the 16th Annual IEEE International Conference on Sensing, Communication, and Networking, Jun. 10, 2019, 8 Pages.

Vijayan, Jai, "Emerging Long-Range WAN Networks Vulnerable to Hacking, Compromise", Retrieved from: https://www.darkreading.com/iot/emerging-long-rangewan-networks-vulnerable-to-hacking-compromise/d/d-id/1336899, Jan. 28, 2020, 8 Pages.

Vutukuru, et al., "Cross-Layer Wireless Bit Rate Adaptation", In Proceedings of the ACM SIGCOMM Conference on Data Communication, Aug. 17, 2009, pp. 3-14.

Hermawan, et al., "CNN-Based Automatic Modulation Classification for Beyond 5G Communications", In Journal of the IEEE Communications Letters, vol. 24, Issue 5, Jan. 31, 2020, pp. 1038-1041.

Joshi, et al., "Blind and Adaptive Reconstruction Approach for Non-Uniformly Sampled Wideband Signal", In Proceedings of the International Conference on Advances in Computing, Communications and Informatics, Sep. 21, 2016, pp. 2341-2345.

"International Search Report and Written Opinion Issued in PCT Application No. PCT/US2021/028528", dated Jul. 23, 2021, 12 Pages.

Shi, et al., "Enabling Direct Messaging from LoRa to ZigBee in the 2.4 GHz Band for Industrial Wireless Networks", In Proceedings of the IEEE International Conference on Industrial Internet, Nov. 11, 2019, pp. 180-189.

* cited by examiner

ADAPTIVE RADIO CONFIGURATION IN WIRELESS NETWORKS

CROSS REFERENCE TO RELATED APPLICATIONS

This application claims priority to Indian Provisional Patent Application Ser. No. 202041021481, filed May 21, 2020, the entirety of which is hereby incorporated herein by reference for all purposes.

BACKGROUND

Low power long-range wireless networks like LoRa (Long Range) have become increasingly mainstream for Internet-of-Things deployments. Given the versatility of applications that these protocols enable, they have support for many data rates and bandwidths. Yet, for a given network deployment that can span miles, a network operator is required to specify a same configuration or a small subset of configurations for all devices in the network to communicate with each other. This one-size-fits-all approach is highly inefficient in large networks that can span miles and have hundreds of devices, because it will often result in a slower than optimum data transmission rate for many, if not most, of the wireless devices connected to base stations (gateways) on the lower power long-range network.

SUMMARY

A wireless networking system, is provided, which includes a base station device including processing circuitry configured to detect a transmission rate from a portion of a preamble of an incoming packet transmission signal and adapt a radio configuration to receive a remainder of the incoming packet transmission signal at the transmission rate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
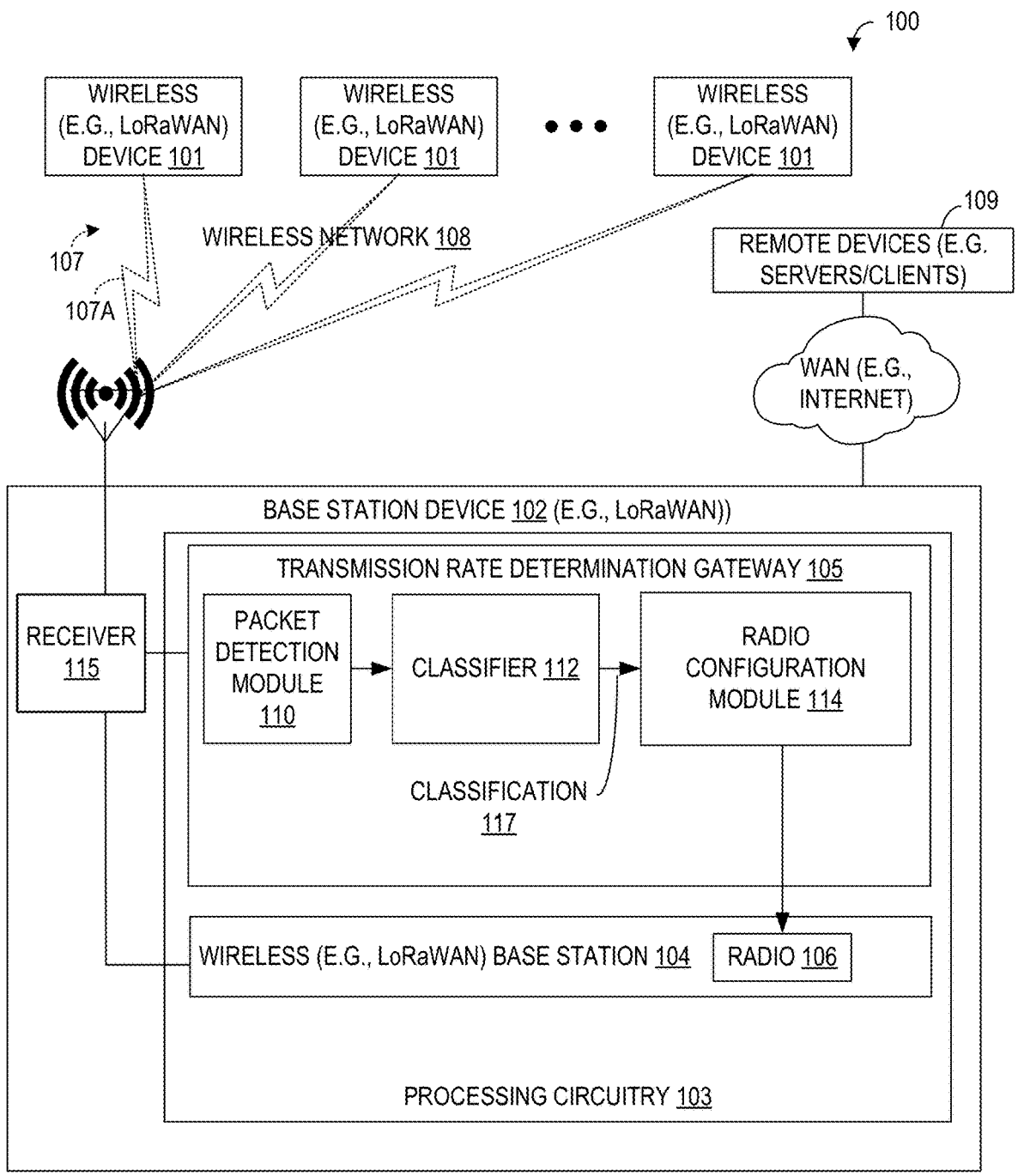
FIG. 1 shows a schematic view of a wireless networking system according to an embodiment of the present disclosure.

To address the above issues, FIG. 1 illustrates an example wireless networking system 100, which is configured to allow network devices to transmit at any data rate. The wireless networking system 100 includes a base station device 102 that uses the first few symbols in a preamble 107A1 of a packet transmission signal 107A to classify a correct data rate, switches a base station radio configuration, and then decodes the data. The design of the present disclosure leverages the inherent asymmetry in outdoor IoT deployments where the clients are power-starved and resource-constrained, but the base station device 102 (i.e., wireless gateway) is not. (Herein, the terms base station and wireless gateway are used interchangeably.) The wireless networking system 100 disclosed herein is backward compatible with existing LoRa protocols and has accurately identify the correct configuration with over 97% accuracy in both indoor and outdoor deployments.

Section 1: Introduction

Low Power Wide Area Networks (LPWANs), such as LoRaWAN, have become increasingly popular for large-scale Internet of Things (IoT) deployments. Despite their nascence, there are over 100 million devices using LoRaWAN already in deployment, with this number expected to exceed 730 million by 2023. LPWANs can operate at lower power in comparison to other mainstream solutions, communicate over long distances, and are low-cost. These characteristics make equipment configured with such radios ideal for low throughput large-scale networks in cities, agriculture, forests, and many other industries.

Figure 4A:
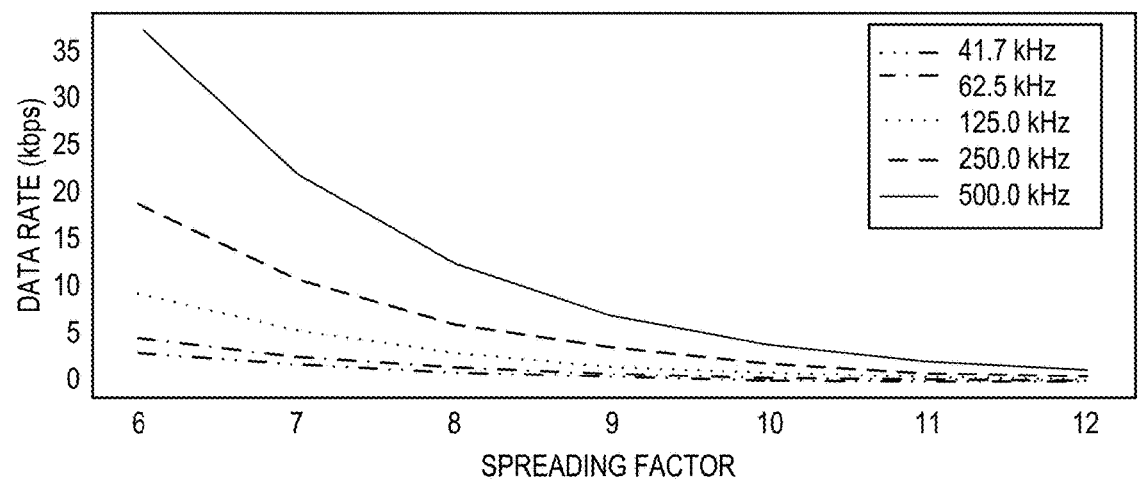
FIGS. 4A and 4B show graphs depicting data rates and preamble structures for transmitted packets such as those in FIG. 1.
Figure 4B:
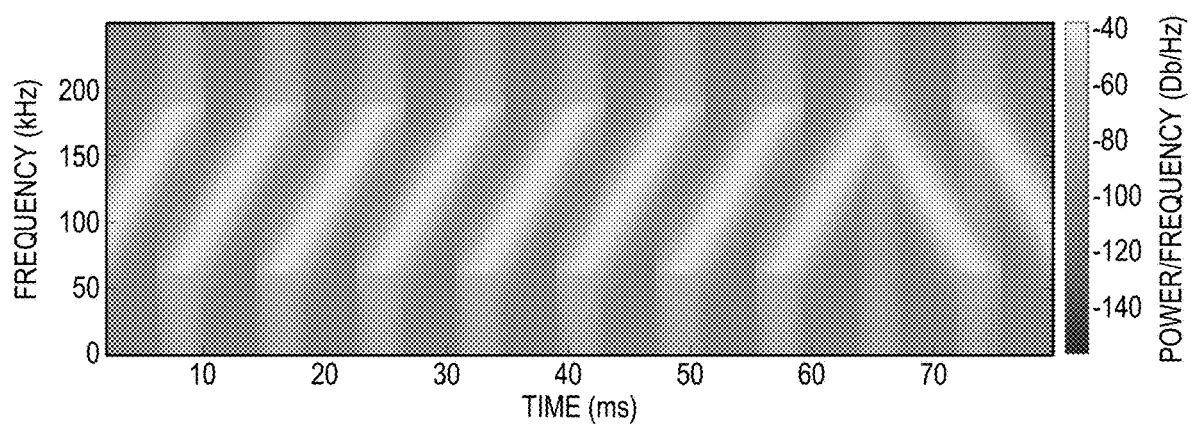

To support long range and diverse device requirements, LoRaWAN can operate at many different data rates. The data rate is configured using two parameters: bandwidth (BW) of the chirp used in LoRa transmissions and the spreading factor (SF), as shown in FIG. 4A. FIG. 4B shows a spectrogram of a LoRa preamble having eight upchirps and two downchirps. The actual data rate also depends on the code rate used to ensure error correction. A fixed code rate is assumed. As expected, higher bandwidth enables higher data rate. The spreading factor defines the time it takes to transmit one chirp, i.e. higher spreading factor means it takes longer to transmit a signal and hence lower data rate. The popular LoRa implementations can support bandwidths from 7.8 kHz to 500 kHz and spreading factors from 7 to 12 (on the log scale). Therefore, a device transmitting at 7.8 kHz and spreading factor 12 will achieve an approximately 1189 times lower data rate than a device transmitting at 500 kHz and a spreading factor of 7.

In spite of this wide range of possibilities for devices in a network, the current paradigm requires a system designer to configure a single configuration setting (or a small subset of compatible configuration settings) of bandwidth and spreading factor for the entire network, i.e., the bandwidth and the spreading factor is the same for all the devices. Even though LoRaWAN Automatic Data Rate (ADR) algorithms have been proposed, they can take hours to days to converge, have significant control overhead, and do not handle multiple bandwidths. Consequently, for example, in a farm network, the configuration of the network is typically set such that it can connect a device such as a tractor at a farthest location on the farm, even though most network-connected sensors on the farm and even the tractors are usually close by a nearest wireless base station device for the network. This design choice stems from the need to limit complexity in the network and to reduce control overhead of coordinating frequent data rate changes. However, this design choice has three severe shortcomings, described below.

Network Throughput

LPWAN devices operate over large areas. A single LoRa gateway (a LoRaWAN uses a gateway-client mode of operation) is designed to cover a range of about 10 km with up to thousands of devices. In such large deployments, the devices at the end of range can barely support the lower data rates. As a result, this 'single-size-fits-all' design forces even the devices that can support high data rates to operate at an extremely low data rate. This reduces the overall network throughput and reduces the number of devices that the network can support by up to two orders of magnitude.

Deployment Overhead

The optimal configuration for the gateway needs to be set by the network operator. Typically, this is accomplished by testing multiple configurations and selecting the configuration that works for all client devices. This process requires technical labor and is not always available; for instance, when deploying such devices in remote rural areas for agriculture monitoring. Second, the configuration selection needs to be dynamic. Due to changes in the environment or due to incremental deployment of devices, this configuration will stop working for a subset of the devices over time and will need frequent updates.

Mobility

The IoT device could be on a mobile vehicle, such as a tractor, bus, or a pickup truck. The optimal configuration varies as the vehicle moves around and is difficult to predict prior to the movement. The lowest data rate configuration may be selected, but this can significantly reduce the capacity of the network.

Presented here is a new wireless networking system 100 that can support wireless devices 101 transmitting at different data rates. Each wireless device 101 transmits at a best possible data rate for themselves, which could depend on the signal quality and application requirements, without requiring the wireless device 101 to inform the base station device 102 about the wireless device 101 configuration a priori, i.e., prior to initiating wireless communications. The approach described herein does not require wireless devices 101 to transmit any control packets, does not require changes to the LoRa protocol, and is backwards compatible with existing devices (i.e. does not require any hardware changes for the IoT wireless devices 101 using the LoRa protocol).

Figure 5:
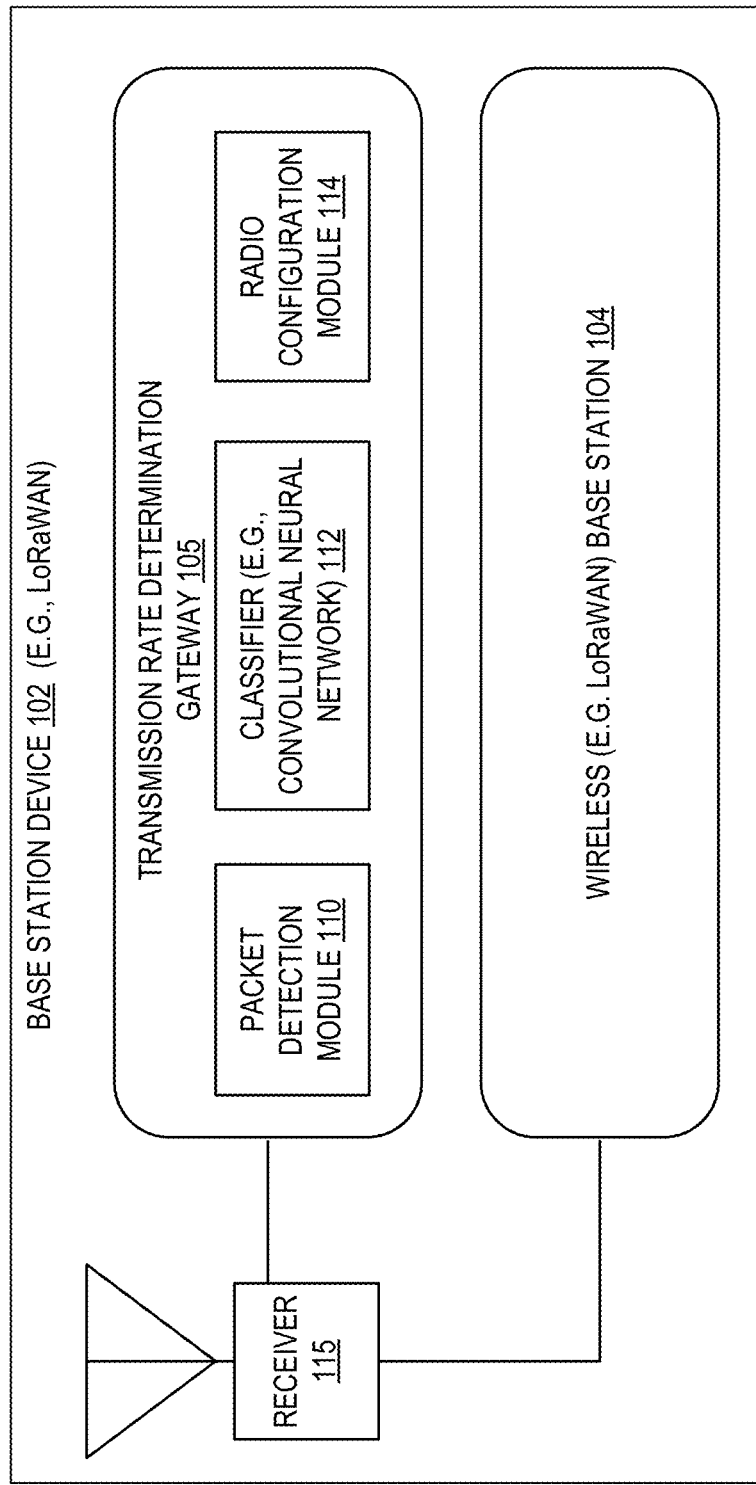
FIG. 5 shows a schematic view of a base station device, such as that of FIG. 3, configured with a software-designed radio.

The wireless networking system 100 uses a software-defined radio (SDR) in front of a LoRa transceiver in the wireless base station 104 acting as the wireless gateway, as shown in FIG. 5. The SDR detects the preamble, identifies the bandwidth and spreading factor of the signal from the preamble, and tunes (i.e., adapts) the radio configuration of the LoRa radio to the right settings to receive the packet. This allows the wireless gateway to successfully receive packets from clients operating at any configuration. Since this approach operates on a per-packet level, it supports data rate changes due to client mobility as well as dynamic changes in the environment. Within the wireless networking system 100 is a set of neural networks that use a small number of samples from LoRa chirps to make classify the correct radio configuration at the base station for each incoming packet transmission signal 107A.

The configuration of the wireless networking system 100 disclosed herein addresses the following three technical goals and associated challenges to achieving these technical goals in practical deployments.

Sensitivity

To maintain the long-range aspect of LoRa deployments, a first potential technical goal for the wireless networking system 100 to be able to operate at low signal to noise ratios (SNRs).

Real-Time Operation

A second potential technical goal for the wireless networking system 100 is to be able to detect a packet via the SDR and reconfigure the LoRa radio in real-time, with sufficient time to properly receive the remainder of the packet signal, to thereby ensure that the packet is not lost.

Compatibility with Existing Deployments

A third potential technical goal is for existing deployments to not require protocol or client hardware changes to existing LoRa devices, although future generations of device would not be so limited by this constraint.

Described below are the challenges associated with meeting these technical goals and an overview of the system of the present disclosure in Section 2 follows the discussion of the challenges.

The wireless networking system 100 of the present disclosure takes a novel approach to the fundamental rate adaptation problem in mobile networks. It does not require the client devices and the gateway to agree on a rate a priori. One might wonder if one can borrow from existing rate adaptation protocols like Wi-Fi instead, where the lowest data rate is used to send the preamble that includes the data rate configuration. Such an approach is ill-suited to LPWANs because they are primarily designed for large scale deployments where each client needs to send small amounts of data. In addition, since the data rate variation in LPWANs is higher than Wi-Fi, this causes very high overhead for packets sent at high data rates with a low amount of data (one symbol at the smallest data rate is 1189 times longer than one symbol at the highest data rate). Furthermore, this adds hardware complexity to the design of the client devices and does not directly account for different bandwidths used by clients in LoRa.

The gateway of the wireless networking system 100 is implemented using the Universal Software Radio Peripheral (USRP) SDR platform, which in one implementation can be realized with off-the-shelf LoRa chipsets as clients. The wireless networking system 100 has been evaluated in a broad variety of settings: benchtop experiments with varying signal strengths, an indoor deployment across multiple rooms, and an outdoor deployment. Results are summarized below.

In tests, the configuration of the wireless networking system 100 configuration detection algorithm could detect the correct encoding parameters for the incoming packet transmission signal with an accuracy of 99.8%, 95%, and 98.2% in indoors, outdoors, and benchtop experiments respectively. In contrast, an auto-correlation baseline achieves an accuracy of 67.4%, 67%, and 78% respectively.

The wireless networking system 100 continues to operate effectively at low SNRs: achieves an accuracy of 94% even when the signal is attenuated by over 140 dB.

An algorithm of the wireless networking system 100 can generalize effectively to new environments and continues to operate in dynamic environments across time. In an experiment lasting five days, the accuracy of the wireless networking system 100 was consistently over 99% with minor daily variations.

Finally, it will be appreciated that the wireless networking system 100 disclosed herein can be applied to future generations of devices. As neural networks evolve and faster hardware implementations are developed, the algorithms described herein can be applied to shift the rate adaptation burden to the power-connected base station infrastructure alone (i.e., shift to the gateway/base station devices 102 rather than requiring a coordinated configuration of both the base station devices 102 and mobile wireless devices 101 as is the current situation), to thereby relieve the battery powered mobile devices of the rate configuration overhead. Thus, the approach described herein is not limited in its application to low power wide area networks, but potentially has application to a variety of other types of wireless networks, including high speed networks such as so-called sixth generation (6G) wireless networks currently under development.

Section 2: Challenges

As mentioned above, the wireless networking system 100 disclosed herein aims to achieve the triple objectives of sensitivity, real-time operation, and compatibility. However, each of these objectives is challenging on its own.

First, sensitivity will be discussed. Sensitivity of LPWAN protocols is directly related to the bandwidth. Lower bandwidth signals experience less noise and hence, can be received at lower signal strengths. Conversely, higher bandwidth signals require higher signal strength at a receiver to be correctly decoded. Therefore, if the wireless networking system 100 configures its SDR to operate at a low bandwidth, it will meet the sensitivity requirements, but will miss out on signals received at higher bandwidths. On the other hand, if the wireless networking system 100 sets its bandwidth too high, it might miss out on signals coming from longer distances (and hence lower signal strength) at lower bandwidths.

Second, to ensure real-time operation, it is desirable for the SDR to identify the correct configuration of the packet using just a few symbols. However, the length of the symbol itself depends on the configuration used by the transmitter. A symbol sent using spreading factor 12 is 64 times longer than a symbol using spreading factor of 6. If the signal is sampled for too long, there is risk of missing out on an entire packet for the highest data rate senders. On the other hand, if the signal is sampled for too short a duration, there might not be enough information to identify the correct encoding parameter configuration for the low data rate senders.

Figure 6A:
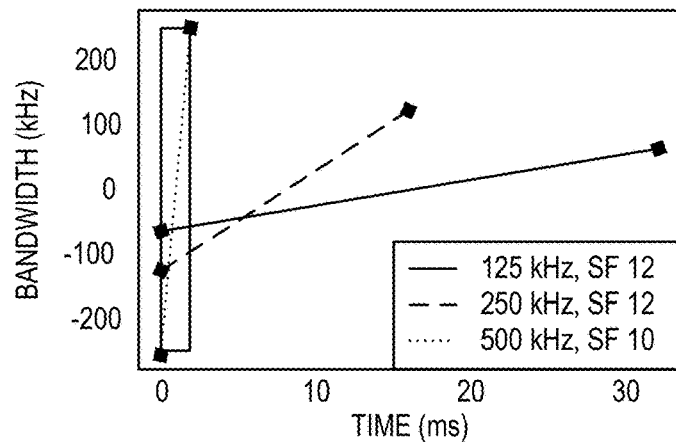
FIGS. 6A-6C show graphs illustrating sampling methods for sampling transmitted packets such as those of FIG. 2.
Figure 6B:
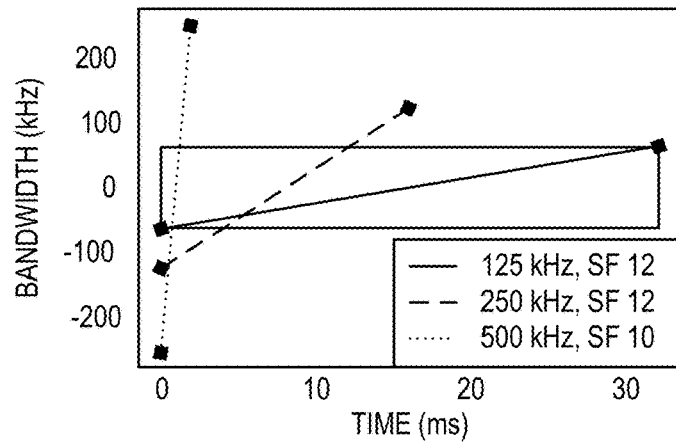
Figure 6C:
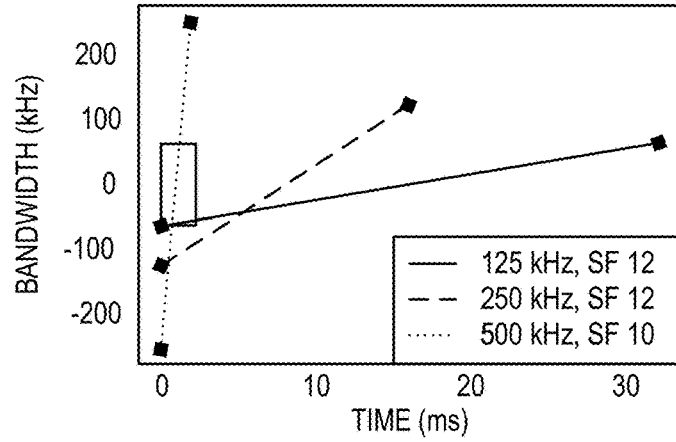

Finally, to ensure backwards compatibility, it is desirable for the wireless networking system 100 to receive the entire packet after the right configuration has been set on the gateway. However, that would require the configuration to be identified before the signal even reaches the gateway—a task that would seem impossible at first blush. These challenges are visualized in FIG. 6. This figure demonstrates the challenge associated with configuring the receiving SDR itself. The figure demonstrates chirps for three different configurations that are relatively close to each other. While even starker differences exist, due to large differences in scale it will be appreciated that such starker differences are difficult to represent visually on such plots. As shown in FIG. 6A, sampling one symbol of the largest bandwidth captures only a small part of the high bandwidth signals and reduces sensitivity. On the other hand, if one symbol length is sampled for the low data rate configuration in FIG. 6B, high sensitivity is maintained, but it introduces significant latency for the high data rate symbol (multiple symbols). Finally, one might wonder, why the minimum of both frequency bandwidth and symbol duration across all possible configurations are not used. This will ensure both sensitivity to low signal strengths and real-time operation. However, as shown in FIG. 6C such a configuration will end up missing out on some configurations all together.

Figure 7:
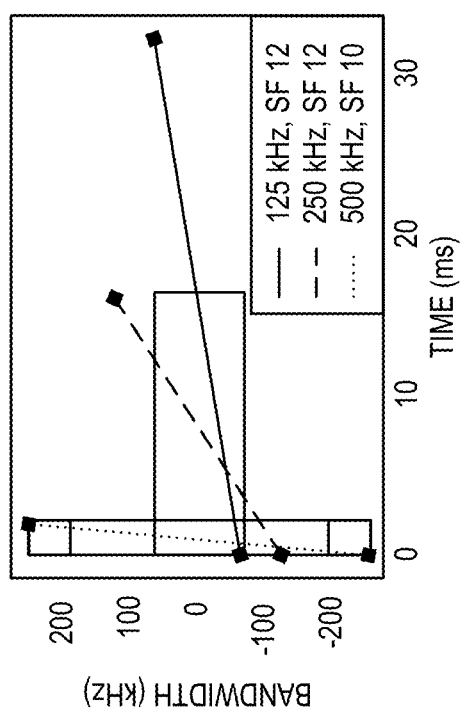
FIG. 7 shows a graph illustrating adaptive sampling of transmitted packets such as those of FIG. 2.

To resolve this conflict between sensitivity and real-time operation, the wireless networking system 100 takes an adaptive approach. It uses a set of band-pass filters in the digital domain to sample small chunks of bandwidth for a short duration of time. It uses these small chunks of bandwidth and frequency to decide if it has captured a signal long enough to make a decision about the configuration or if it needs to sample for longer. In no instance does the wireless networking system 100 use more than a duration of two symbols for any configuration to make this decision. This idea is represented in FIG. 7.

Finally, in order to be compatible with existing hardware, the gateway needs to receive the entire packet after it has been configured. Since the SDR is using at least some part of the preamble to identify the gateway, this goal seems difficult if not impossible at first glance. One way to solve this problem is to buffer the time sample at the transmission rate determination gateway 105 of wireless networking system 100, and then replay it at the radio 106 of the base station 014. However, this complicates the wireless networking system 100 circuitry, and also drives up its cost. Instead, to solve this challenge the structure of the preamble in the LoRa protocol is exploited. Significant to the operation of this system is the operational principle that the preamble length of a packet can be dynamically configured. A corollary operational principle is that the dynamically configured preamble can be larger than the preamble length needed by a base station radio to detect the packet. The rest of the symbols can be used by the wireless networking system 100 to determine the configuration parameters, and to set these parameters at the base station radio. For instance, the base station can be configured to expect a preamble of eight symbols, but the client can be configured to use ten symbols. These extra two symbols can be allocated for the purpose of the base station of the wireless networking system 100 predicting the encoding parameters of the incoming packet transmission signal and reconfiguring the LoRa base station to properly receive the signal based on the encoding parameters. The gateway can then use the remaining signal to decode the packet. Note that, since the number of upchirps is variable, the gateway still sees a full preamble with a sequence of upchirps followed by two downchirps and is able to successfully decode the packets.

Section 3: LoRa

Figure 8A:
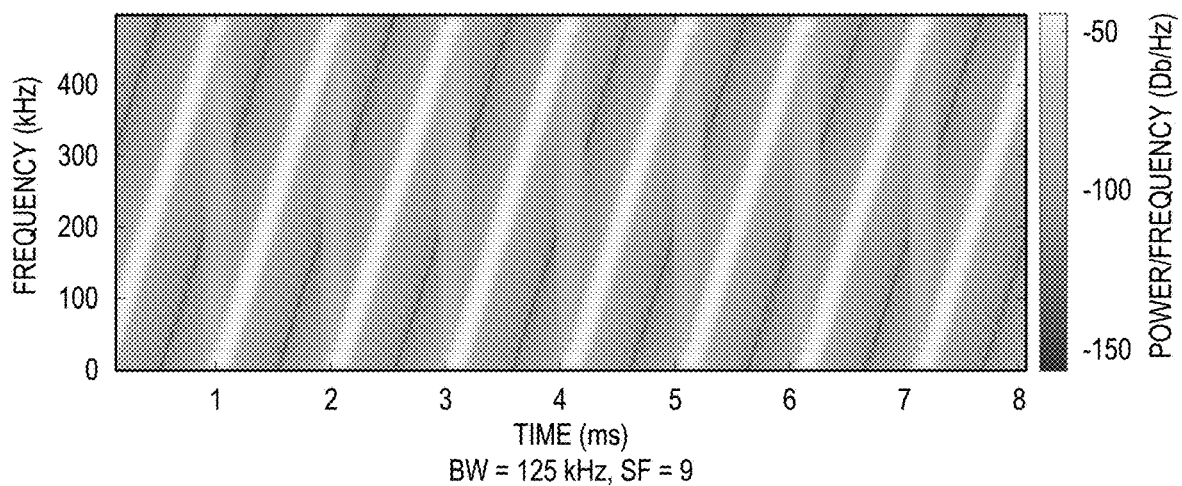
FIGS. 8A-8C show spectrograms of LoRa upchirps included in transmitted packets such as those of FIG. 2.
Figure 8B:
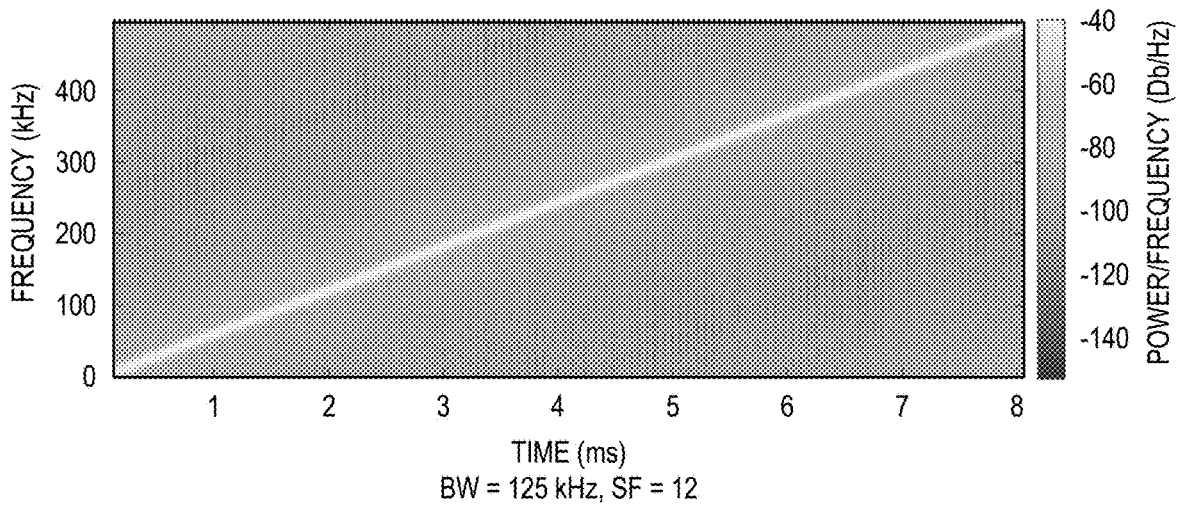
Figure 8C:
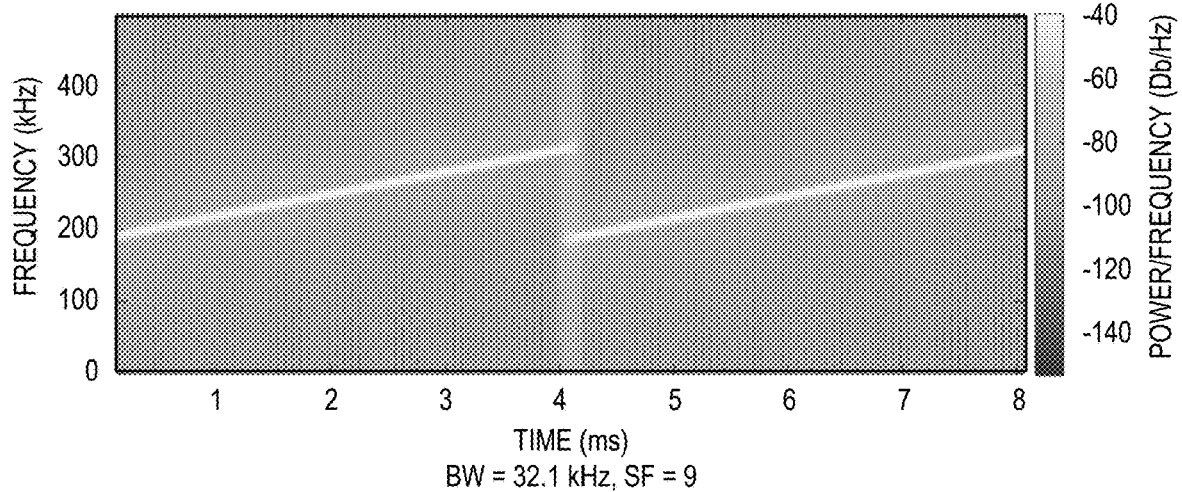

LoRa is a physical layer implementation for LPWANs based on chirp spread spectrum (CSS) techniques. In LoRa modulation, chirp signals are generated to encoded data symbols. The frequency of the chirp varies linearly with time as shown in FIG. 8. Two parameters define the effective data rate: bandwidth and spreading factor. The bandwidth controls the total span of the chirp in the frequency domain. The spreading factor defines how long each chirp is in the time domain. Specifically, for a chirp with spreading factor SF the time taken to transmit it is directly proportional to $2^{SF}$.

The time taken to transmit a chirp, $T_S$ is therefore given by, $$T_s = \frac{2^{SF}}{BW},$$

where BW is the chirp and SF is the spreading factor. Therefore, higher bandwidth reduces the duration of each chirp and higher spreading factor exponentially increases the duration of each chirp.

To communicate bits of information, the transmitter modifies the initial frequency of the chirp, f. Specifically, to send symbol value S, the transmitter sets the starting frequency to:

$$f(S) = S \times \frac{BW}{2^{SF}} \quad (1)$$

LoRa allows S to take values in the range $\{0, 2, 2, \ldots, 2^{SF}\}$. Thus, one chirp communicates one symbol which communicates SF bits. As a result, the effective data rate, R, for a LoRa transmission is:

$$R = SF \times \frac{1}{T_s} \quad (2)$$

$$= SF \times \frac{BW}{2^{SF}} \quad (3)$$

As shown in Eq. 2, increase in bandwidth increases the data rate. Decrease in spreading factor increases the data rate. One might wonder if higher SF lowers the rate, why use it at all. This is because higher SF also increases the duration of a symbol making it easier to correctly decode.

To conclude, the terminology for the rest of the paper is reiterated. A symbol is a unit of data that is conveyed by each chirp. The duration of the symbol is the same as the duration of the chirp. Each symbol or chirp is composed of multiple samples, depending on the sampling rate and the sample duration. For instance, for a sampling rate of $10^6$ samples per second, a symbol duration of 2 ms will correspond to 2000 samples.

Section 4: The Wireless Networking System

The wireless networking system 100 disclosed herein is a new gateway design for LoRa that supports dynamic link configurations. With the wireless networking system 100 clients can optimize their data rates without needing to inform the wireless base station 104 of their updated configuration. In turn, this allows a single wireless base station 104 to support hundreds of wireless devices 101 at large-scale without compromising performance. For example, a LoRa network deployment can include client devices that are dispersed across a radius of several miles from the base station device 102. Across this coverage area, the achievable throughput varies with respect to distance and diverse channel conditions. The wireless networking system 100 enables LoRa networks to support a wide range of configurations, which otherwise would have to compromise performance in order to support all devices in the vast coverage area.

Figure 10:
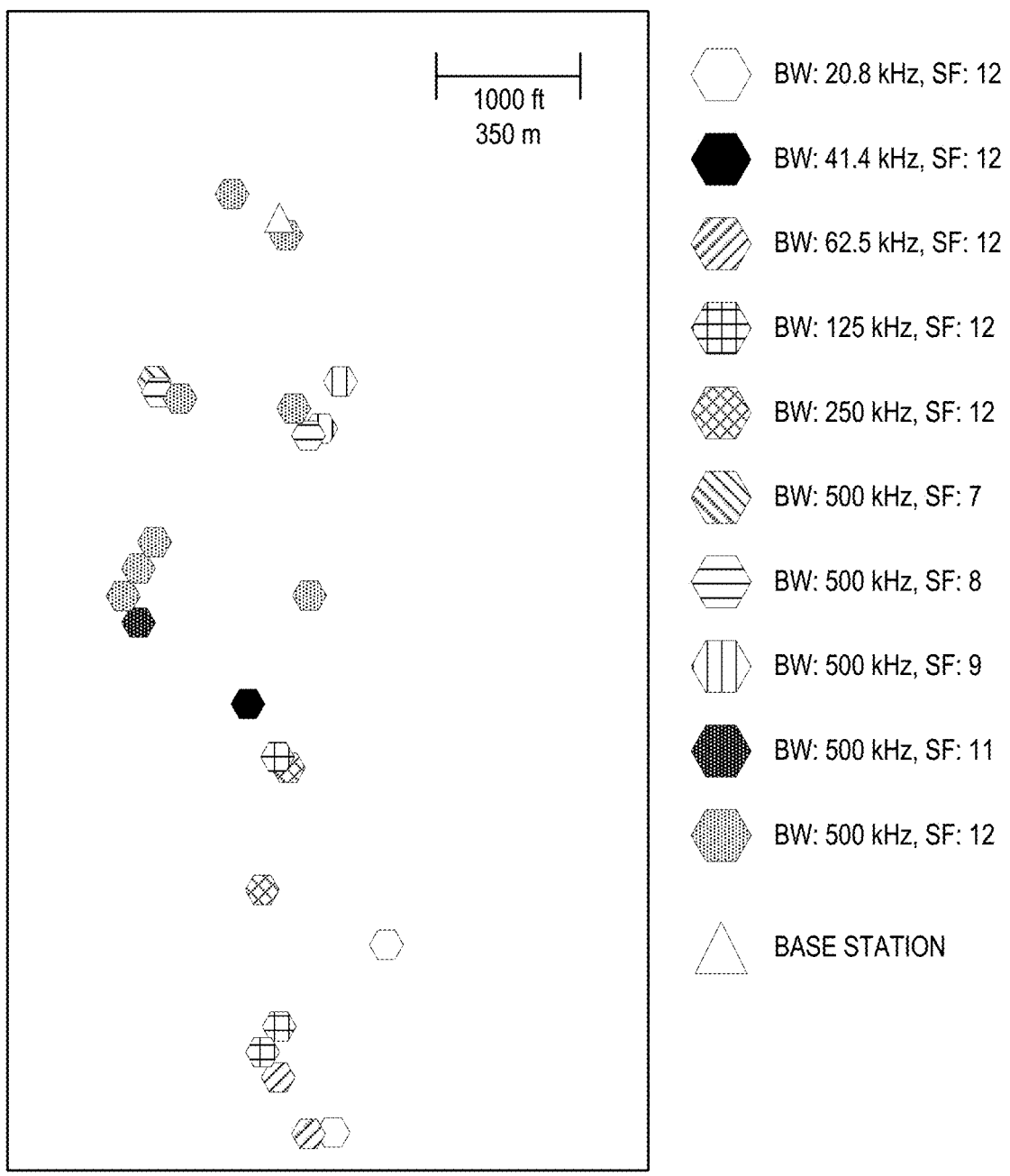
FIG. 10 shows a coverage map illustrating supported combinations of spreading factor and bandwidth supported by the base station device of FIG. 3.

To gain a better understanding of the performance of LoRa a range test was conducted to determine the maximum achievable data rate with respect to distance from the base station device 102. FIG. 10 shows a coverage map for the best configuration settings that can be supported while maintaining a reliable communication link between a LoRa base station and a client. On an industry campus setting the base station was placed at a fixed location and varied the client location across the campus. The client wireless devices continuously transmitted LoRa packets with a transmit power of 20 dB and at each location encoding parameters were varied to test the limitations of the system. FIG. 10 shows the maximum supported data rate across all locations as well as the corresponding BW and SF. The key takeaway is that there is much variation across the supported encoding parameters, justifying the desire to support a more dynamic network.

The wireless networking system 100 achieves this by taking a neural networking approach to predict the bandwidth and spreading factor used by any given client for data transmission. In turn, the radio of the base station device is reconfigured accordingly to properly receive and decode incoming packets. One view of the architecture of the base station device 102 of the wireless networking system 100 is shown in FIG. 5. As shown, the base station device 102 includes a transmission rate determination gateway 105. The transmission rate determination gateway 105 is an SDR as discussed above, and has three constituent components: a packet detection module 110 (packet detector) to detect incoming LoRa packet transmissions, a classifier 112 (which may be a neural network processing unit as described below) to classify the encoding configuration, and lastly a radio configuration module 114 that communicates with the LoRaWAN wireless base station 104 to update encoding parameters. Although the LoRaWAN wireless base station 104 includes "base station" in the name and the transmission rate determination gateway 105 includes "gateway" in the name, it will be appreciated that both are included in a single device that functions as a base station device 102 and also when connected to a WAN function as a gateway to the WAN.

FIG. 1 depicts at 100 a general depiction of the wireless networking system thus described, in which the base station device 102 as described in FIG. 5, may be deployed. As shown, the wireless networking system 100 includes the base station device 102 configured to communicate via wireless network 108 (e.g., a LoRa network) using signals 107 with a plurality of wireless devices 101 (e.g., LoRaWAN configured devices). The base station device 102 is configured to function as a gateway device to a wide area network (WAN) such as the Internet, over which the base station may communicate with remove devices, such as remote servers and remote clients, for example.

The base station device 102 includes processing circuitry 103 configured to detect a transmission rate from a portion of a preamble 107A1 of an incoming packet transmission signal 107A and adapt its radio 106 to receive a remainder 107A2 of the incoming packet transmission signal 107A at the transmission rate. The base station device 102 is configured to implement a low power wide area network and the incoming packet transmission signal 107A is sent from the wireless device 101 to the base station device 102 according a LoRaWAN communication protocol. Thus, in this example the incoming packet transmission signal 107A is sent from a plurality of wireless devices 101 using LoRaWan networking protocol, however other networking protocols may be used. For example, other low power long range protocols may be used, or high-speed networking protocols such as 6G, or another suitable networking protocol may be used. In this example, three wireless devices 101 are shown communicating with the base station device 102, however it will be appreciated that up to thousands of wireless devices 101 may communicate with the base station device 102.

Figure 3:
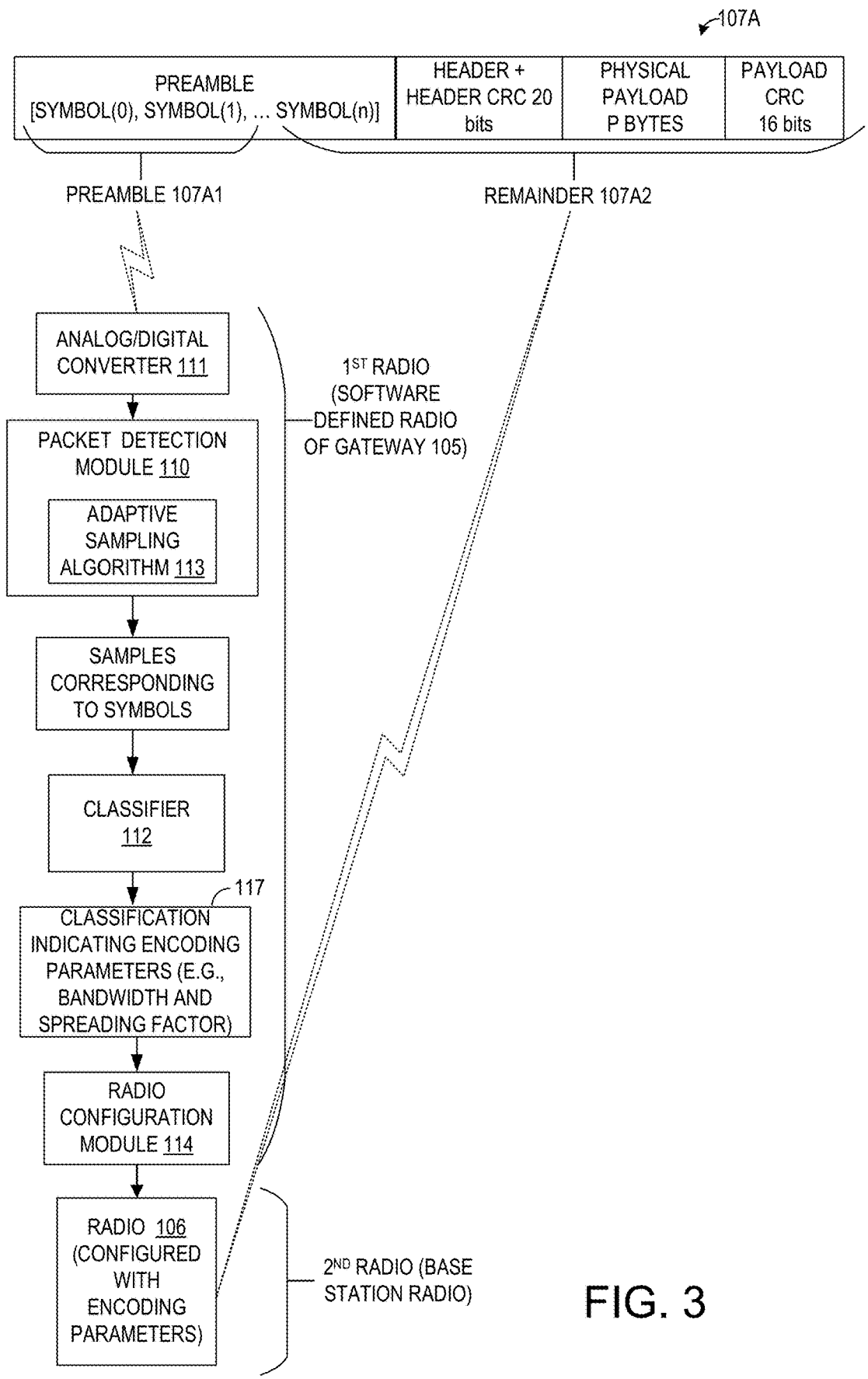
FIG. 3 shows a schematic view of a base station device reading a transmitted packet of FIG. 2.

Continuing with FIG. 1, transmission rate determination gateway 105 (which is an SDR as described above) of the base station device 102 further includes a packet detection module 110 that implements an adaptive sampling algorithm to collect samples of the preamble 107A1 of the incoming packet transmission signal 107A, the incoming packet transmission signal 107A being received by a receiver 115 of the base station device 102 from one of the plurality of wireless devices 101. The transmission rate determination gateway 105 of the base station device 102 further includes a classifier 112 which may take the form of a CNN configured to receive the samples and to output a classification 117 that indicates one or more encoding parameters of the incoming packet transmission signal. In this example, the encoding factors are bandwidth and spreading factor, however, in other examples, other encoding factors may be used. The transmission rate determination gateway 105 further includes a radio configuration module 114 that sends a configuration command to configure a radio 106 of the wireless base station 104 to receive a remainder 107A2 of the incoming packet transmission signal 107A according to the one or more encoding parameters, such as bandwidth and spreading factor, indicated by the classification 117. The processes described in this paragraph are also illustrated in FIG. 3, which shows the preamble 107A1 being processed by the adaptive sampling algorithm to produce samples corresponding to the initial symbols in the preamble, and then being processed by the classifier 112 to produce the classification 117 indicating the encoding parameters, which in turn is used to configure the radio 106 to properly receive the remainder 107A2 of the incoming packet transmission signal 107A.

Three technical challenges exist to implementation of wireless networking system 100. First, the challenge exists for wireless networking system 100 to determine the configuration parameters of a received packet in near real-time. Second, the challenge exists for wireless networking system 100 to be backwards compatible with existing LoRa solutions. Third, it is a challenge for the wireless base station device 102 of the wireless networking system 100 to achieve high prediction accuracy across a variety of possible encoding parameters that may be selected by the wireless devices 101. The following sections detail how the wireless networking system 100 addresses each challenge and describe the architecture of a neural network that may be used to implement the classifier 112.

4.1 Real-Time Prediction

To successfully decode incoming packets transmission signals 107A, the base station device 102 needs to configure its radio 106 with parameters that match the incoming packet transmission signal 107A. This reconfiguration needs to be accomplished quickly enough such that the radio 106 still has time to detect the incoming packets transmission signals 107A. To detect the incoming packets transmission signals 107A, the radio 106 needs the preamble 107A1 of the incoming packets transmission signals 107A.

As mentioned in Section 2 the wireless networking system 100 uses extra symbols added to the preamble 107A of LoRa packets to determine configuration parameters and set these parameters at the radio 106 of the base station device 102. To validate this approach, two Semtech SX1276 LoRa chips were configured as a base station device 102 and wireless device 101, respectively. The API of popular LoRa chipsets (Semtech SX1262/1276) were used to configure the preamble of a LoRa packet from 6-65535 symbols, where the minimum of six symbols is needed for packet detection. The preamble 107A1 at the base station device 102 was set to eight symbols, while varying the wireless device 101 preamble length. The wireless device 101 transmitted packets over the air using different preamble lengths and then the packet reception was verified at the base station device 102. The results demonstrated that an extra five symbols can be added to the preamble 107A1 of the wireless device 101, while still maintaining reliable reception at the base station device 102. The wireless networking system 100 requires up to two symbols depending on the encoding parameters used for the input data. The variation is due to the fact that for any neural network the input shape of the data is to be consistent. Depending on the number of data samples passed into the network for classification, the number of symbols used for any given input will vary as well because the duration of the symbol is a function of BW and SF.

4.2 Inferring SF and BW

As discussed above, the encoding parameters are not pre-negotiated between the wireless device 101 and the base station device 102, prior to the base station device 102 receiving the incoming packet transmission signal 107A. It will be appreciated that in the wireless networking system 100, the wireless device 101 is configured to set the encoding parameters, such as bandwidth and spreading factor, to values selected at the wireless device 101 from among a plurality of preset values for the encoding parameters. These preset values typically include all possible values defined as usable by the networking protocol, such as LoRaWAN, and are typically not a subset of such possible encoding parameters set during a configuration step by a network administrator. Once the wireless device 101 autonomously selects the encoding parameters, the wireless device 101 is configured to commence transmitting the incoming packet transmission signal 107A according to the encoding parameters without engaging in any prior communications with the base station device 102 to pre-negotiate the encoding parameters.

The wireless networking system 100 aims to predict the spreading factor and bandwidth of LoRa packet transmissions using a neural networking approach. Before diving into the network architecture, it will be described why BW and SF can be inferred to begin with. The variation between certain combinations of BW and SF can be easily distinguished just by comparing the number of samples per symbol. However, there are cases where the total number of samples are identical (e.g. BW=125 kHz, SF=8 and BW=500 kHz, SF=10).

One approach to distinguish between encoding configurations is to first compare the frequency increase with respect to time for any given chirp. This would provide insights on spreading factor. Second, the start and stop frequency of the chirp can be used to determine the bandwidth. Referring back to FIGS. 8A and 8B, it is shown that the rate of change across frequency varies with respect to spreading factor and the difference between start and stop frequency result in the bandwidth used for the chirp. This technique would suffice if the entire symbol duration is used to predict parameters, however, doing so would significantly increase latency since a single symbol can have a duration as high as 525 ms. Thus, the number of samples used to determine the encoding parameters will be minimized.

The previously described method can still be used to infer spreading factor and bandwidth using a subset of samples of a LoRa preamble symbol, however the tradeoff in this case is accuracy. Distinguishing between different encoding parameters can become even more challenging when considering the variation in RSSI and SNR that a signal can experience when transmitting over the air. The wireless networking system 100 takes into account the described characteristics of LoRa chirps to train a convolutional neural network (CNN) to classify the many different combinations of spreading factor and bandwidth. Specifically, three features extracted from the symbols of the LoRa preamble 107A1 to perform classification are used.

Figure 2:
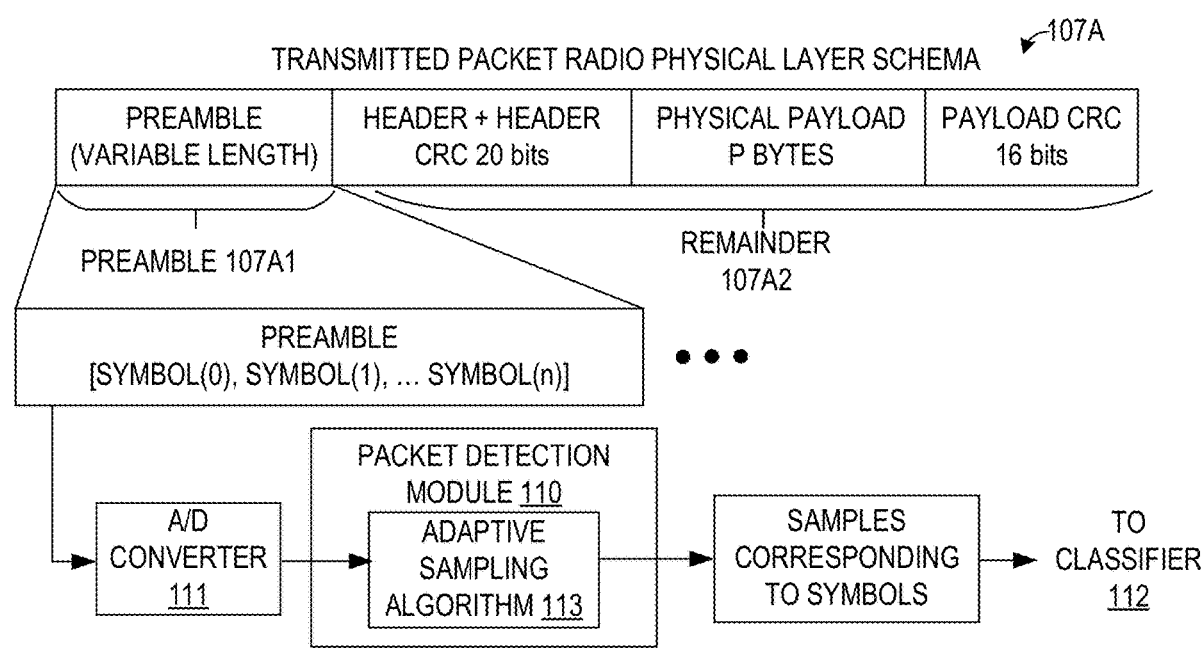
FIG. 2 shows a schematic view of a transmitted packet being analyzed by the wireless networking system of FIG. 1.

Accordingly, it will be appreciated that in the wireless networking system 100, as shown in FIG. 2, may include an analog digital converter 111 configure to sample the incoming transmission signal at a varying rate under the control of an adaptive sampling algorithm 113 implemented by the packet detection module 110. The samples taken from two symbols or less are typically used by an artificial intelligence model of the classifier 112, described in the following section, to output the classification 117. Thus, specifically, the samples include samples taken from two symbols (e.g., symbol(0) and symbol(1)) in the preamble 107A1 of the incoming packet transmission signal 107A, and the artificial intelligence model of the classifier 112 uses a plurality of extracted features of the samples to determine the classification 117, the plurality of features including a real component of the samples, an imaginary component of the samples, and a fast Fourier transform of the samples.

Figure 9A:
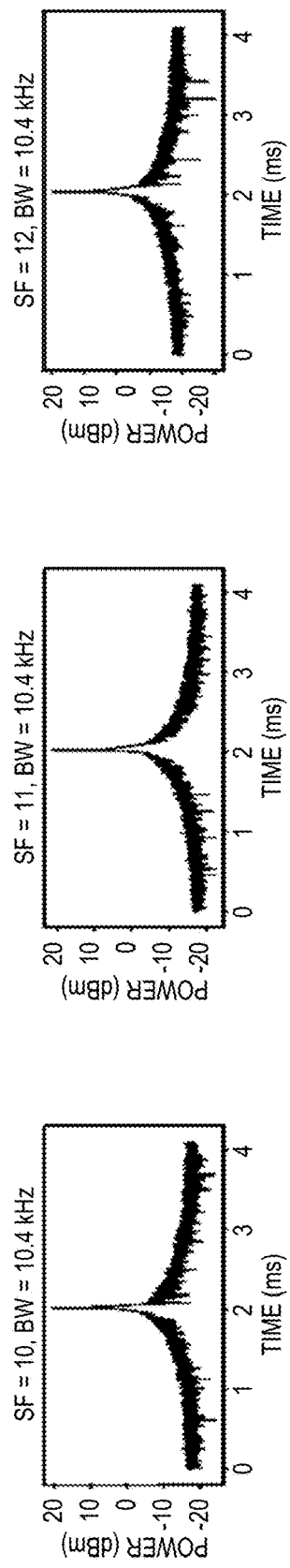
FIGS. 9A-9C show graphs illustrating data features of transmitted packets used by the wireless networking system of FIG. 1.
Figure 9B:
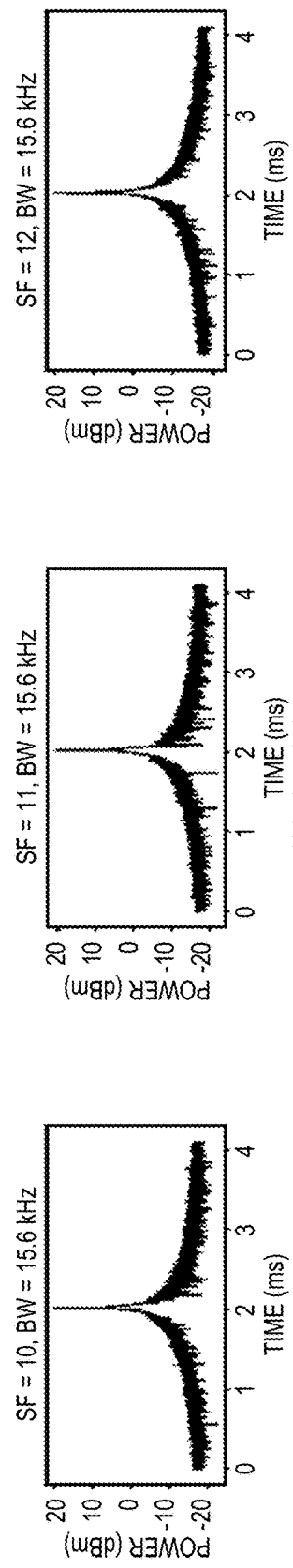
Figure 9C:
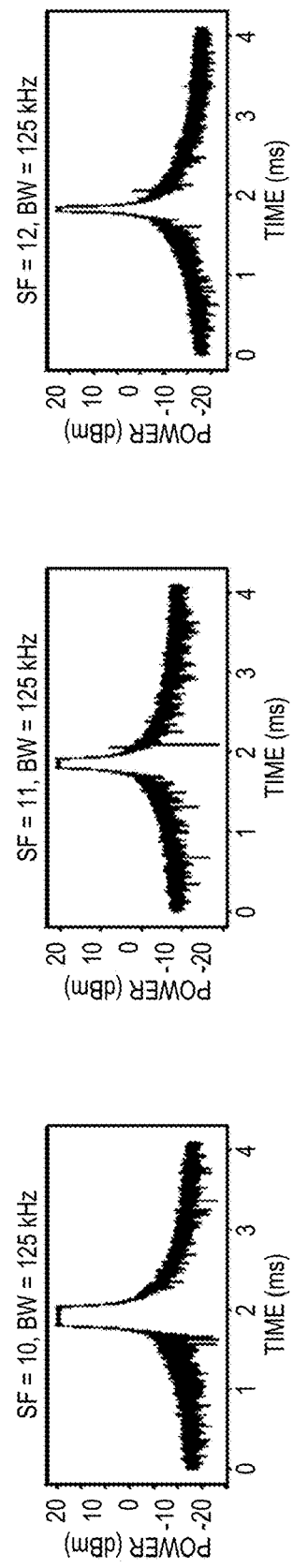

The first two features are the real and imaginary components of the signal and the last is the Fast Fourier Transform (FFT). Using data from both the time and frequency domain of the signal is crucial in achieving high prediction accuracy. For instance, if only the FFT of each signal were used, it would be almost impossible to distinguish between the very low BW settings. As shown in FIG. 9, when evaluating the FFT for different bandwidth and spreading factor settings, the lower kHz range begins to look quite similar. Supplementing this with features from the time domain helps catch the variation in the frequency of oscillation of a preamble symbol, while the FFT provides insight on bandwidth variation.

4.3 Adaptive Sampling

The wireless networking system 100 uses an adaptive sampling method to optimize sensitivity, latency, and classification accuracy. Referring back to FIG. 7, the adaptive sampling method is illustrated. A set of digital band-pass filters is used to create subsets of bandwidth for a short time duration.

The adaptive sampling algorithm 113 depicted in FIG. 2 is configured to filter the incoming packet transmission signal 107A using one or more band pass filters to thereby generate a plurality of filtered incoming packet transmission signal components, and determine that the captured signal is sufficient to determine the one or more encoding parameters for one of the filtered incoming packet transmission signal components.

These subsets are used to determine if the captured signal is long enough to provide accurate insights on radio configurations or if sampling should continue. In particular, the wireless networking system 100 uses a total of 12808 samples (65 ms) for the first six class representing the two low bandwidths and 800 samples (4 ms) for the last nine classes representing the higher bandwidth radio configurations. Intuitively, using a larger set of samples for the lower bandwidth settings makes sense since the symbol duration increases as BW decreases.

4.4 Classifier Architecture

Figure 11:
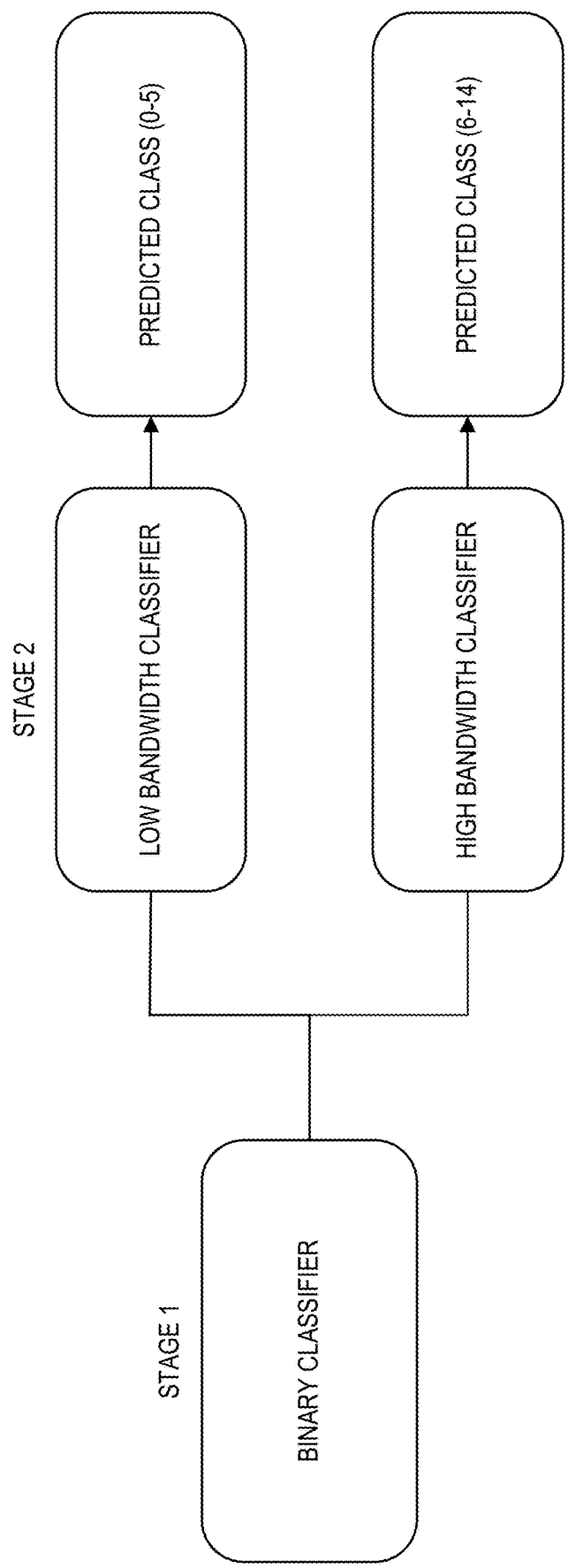
FIG. 11 shows a schematic view of a multi-stage artificial intelligence model used in the wireless networking system of FIG. 1.
Figure 12A:
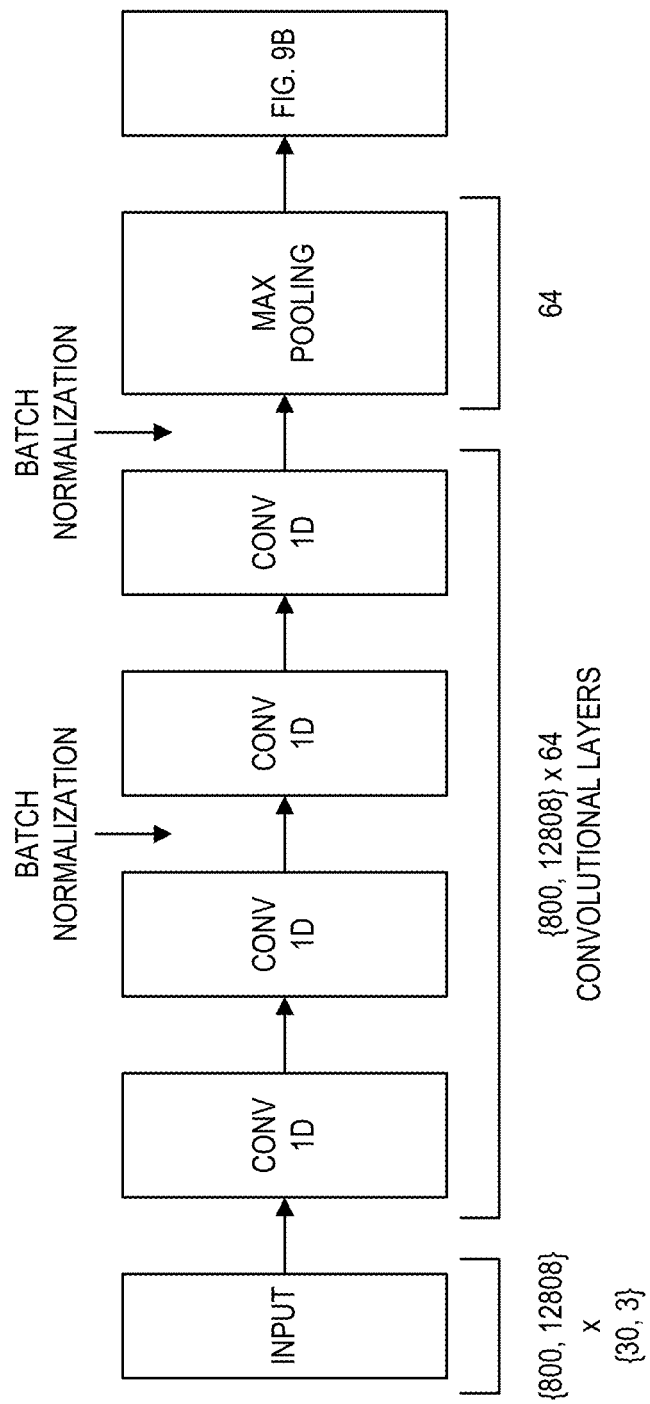
FIGS. 12A-12B show a schematic view of a neural network used in the multi-stage artificial intelligence model of FIG. 11.
Figure 12B:
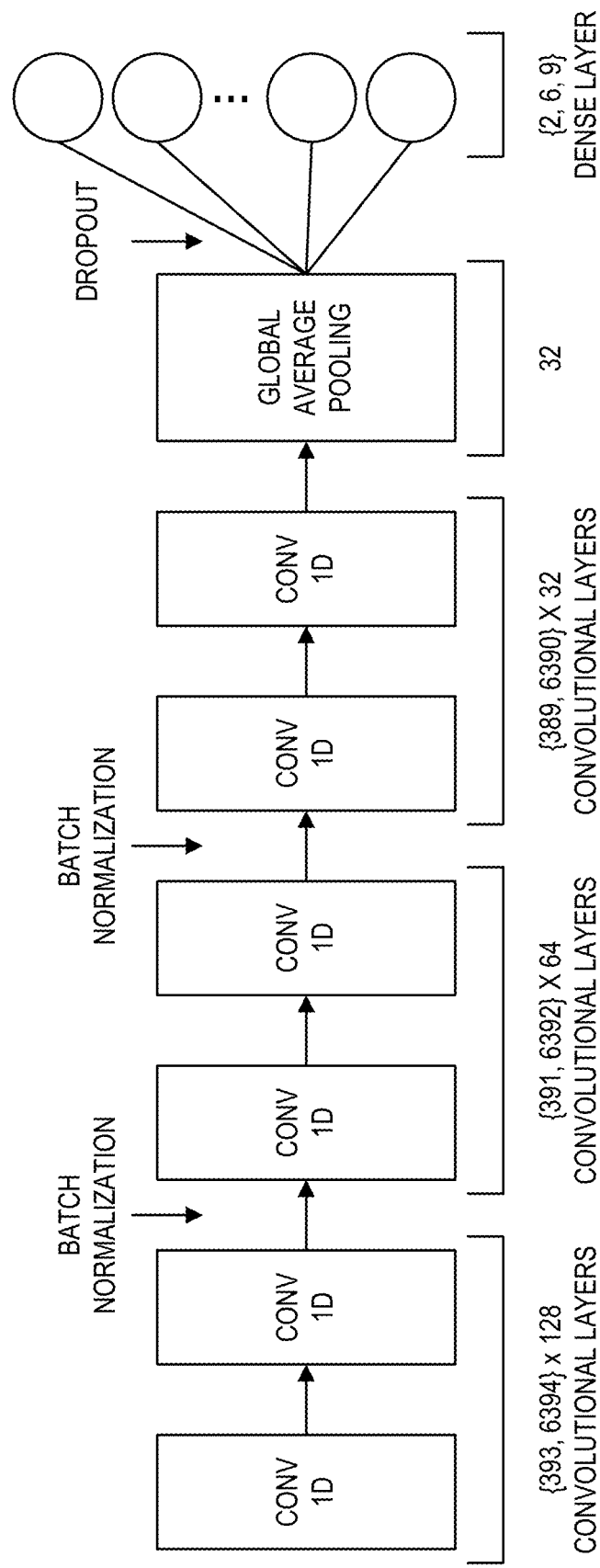

The classifier 112 illustrated in FIG. 1 may be implemented as an artificial intelligence model that includes at least one convolutional neural network, and may use a hierarchical neural network architecture that includes multiple, for example, two, stages. Thus, as shown in FIGS. 11-12B, the artificial intelligence model may be a multistage model and thus may include a first stage and a second stage. The first stage may include a bandwidth classifier including a first convolutional neural network that classifies the incoming packet transmission signal into one of a plurality of bandwidth range classifications, such as high range and low range, for example. Middle ranges between the high and low range may also be defined. In the second stage, for signals having bandwidths below the predetermined threshold, the signals are classified into one of multiple low bandwidth encoding classifications by a low bandwidth encoding classifier including a second convolutional neural network, and for signals above the predetermined threshold, the signals are classified into one of multiple high bandwidth encoding classifications by a high bandwidth encoding classifier including a third convolutional neural network.

Continuing with depicted embodiment of FIG. 11, first a binary classifier is used to distinguish between the lower and higher bandwidths. Depending on the prediction, this will follow by either a six or nine class classifier to predict the BW and SF radio configurations. FIG. 12 illustrates the neural network architecture used by the wireless networking system at each stage, where the key difference is the number of classes, features, and samples inputted per classifier.

The low bandwidth classifier relies on the three features described previously. The binary and nine class classifier uses 30 features to predict radio configurations. The features include the real and imaginary components and FFT; however, the samples are split into ten 20 kHz chunks. The variation in the number of features and samples per classifier is chosen based on the type of signals that need to be classified, as previously discussed in Section 2. For instance, 16× more samples are used for the low bandwidth classifier because the symbol duration can be tens of milliseconds and more samples are needed to have a meaningful feature. On the other hand, the binary classifier uses only 800 samples even for the low bandwidths, but since it does not need to distinguish between individual bandwidths this is sufficient.

The neural network for each classifier starts off with four convolutional layers, each with a filter size of 128. The layers convolve the input and are activated by a Rectified Linear Unit (ReLu) function. The ReLu activation function outputs the max of zero and the input data and provides an output in the form of a feature map. Next is a max-pooling layer that is used to reduce the size of the generated feature map and retain the most meaningful information. In this network a max-pooling size of two is used. This is followed by six more convolutional layers each with a filter size ranging from 128-32. These layers also use the ReLu activation function. A global average pooling layer is added after this, which calculates the average outputs of each feature map from the previous convolutional layer. A final dense layer is applied with a size equal to total number of possible classifications. The dense layer uses a sigmoid activation function that provides the output probabilities across all classes between values of 0 and 1. To retrieve the predicted class maximum probability of the final output layer is taken.

To evaluate how well the neural network models the dataset, a categorical cross entropy loss function is used, $$-\Sigma_{c=1}^{N} t_{i,c} \log(p_{i,c}) \tag{4}$$

where N is the number of classes, p is the predicted probability of the current sample, and t is the binary indicator of whether the class, c, is correct. The loss function evaluates performance of a classification model for output probabilities between 0 and 1. In other words, the cross entropy will increase if the model predictions stray from the actual value and in turn provides a measure for error. To have accurate predictions, error also needs to be minimized, which is done by using an optimization function. At a high level, optimization functions calculate the partial derivative of the loss function with respect to weights used in the model. These weights are modified until a minimum is reached for the loss function. The wireless networking system's 100 network architecture uses an Adam optimizer to perform this task.

Also added within the network are three batch normalization layers and a dropout layer. The batch normalization layers normalize the output of the previous layer by subtracting the batch mean and dividing by the batch standard deviation, where a batch is a portion of data passed into the model for training. Batch normalization improves the stability of the network and helps in reducing the number of epochs needed to train the network. Lastly, for regularization a dropout of 0.5 is used before the final dense layer to reduce overfitting.

Section 5: Implementation

Presented below are details about the implementation of the wireless networking system and the setup for experimental evaluation.

5.1 Hardware

A hardware prototype of the wireless networking system 100 gateway is designed using the universal software radio (USRP) platform. The wireless networking system 100 gateway operates at 915 MHz, the frequency used by most LoRa deployments in the United States. The USRP is co-located with a LoRa receiver which needs to be configured to the correct configuration for it to successfully receive packets.

The clients are designed using the 1276 Semtech chipset. This chipset allows spreading factors ranging from 7 to 12 and the bandwidth ranging from 7.8 kHz to 500 kHz. Bandwidths of 10.4 kHz, 15.6 kHz, 125 kHz, 250 kHz, and 500 kHz are chosen for experiments to cover the extreme ends of the spectrum. It will be appreciated that the smallest difference between bandwidths is used by selecting two of the lowest bandwidths possible. Lastly, spreading factors of 10 to 12 for are used for the experiments.

The client chip is embedded in a PCB that sets the spreading factor, bandwidth, and allows data bits to be transmitted. The chip is controlled using the ARM STM32L151 micro-controller. Custom firmware is written for this micro-controller. The wireless networking system 100 can operate with any such implementation on the client side without any modifications.

5.2 Software

The wireless networking system 100 gateway is controlled using GNU Radio software. The software, running on a computer with 32 GB of RAM, collects samples with a center frequency of 915 MHz and a sampling rate of 200 ksps. This is the minimum sampling rate that can be achieved by the USRP and results in a 200 kHz bandwidth at the receiver 115. Each packet recording is passed through a band-pass filter to further reduce the receiver bandwidth to 20 kHz. The additional filtering is performed to increase the sensitivity of the receiver 115. The samples are then chopped into individual symbols using a packet detection algorithm that uses a combination of power thresholding on a sliding window and auto-correlation.

The CNN is implemented using the Tensorflow 2.0 framework in Python. It runs on a Microsoft Surface 2 with 16 GB RAM and NVIDIA GeForce GTX 1050 GPU with 2 GB memory. The CNN is trained using the Adam Optimizer with default parameters aside from the learning rate set to 0.0001. 20 percent of the training set is set aside as a validation set. The model is trained for 20 epochs for all experiments, and the best model is chosen based on validation set performance. Each experiment is run on three different training-test splits, unless stated otherwise. The number of training points for each experiment is specified in the following section.

Section 6: Results

The empirical evaluation of the wireless networking system 100 is given below.

6.1 Experimental Setup

To evaluate the wireless networking system 100, first a dataset is generated to represent 15 possible classifications for spreading factors ranging from 10-12 and bandwidths of 10.4, 15.6, 125, 250, and 500 kHz. Since the preamble of a LoRa packet is a series of upchirps, a dataset is created that consists of individual chirps in the form of complex baseband signals, extracted from the preamble of each packet. The radio described in Section 5.1 is used to transmit LoRa packets and receive using a USRP. With this setup, data was collected in a controlled, indoor, and outdoor setting.

Indoor Data Collection: Indoor experiments are conducted in an office space. The experiments span six-different rooms covering a total area of 1000 sq. ft. The transmitting device, (e.g. wireless device 101) and receiving device (e.g. of the base station device 102) are randomly placed in different rooms. In each setting, data for each class is collected. For each location, data for 800 symbols per class on average is collected.

Outdoor Data Collection: To emulate an outdoor deployment, data is collected using a campus scale deployment. The receiving device is placed at a fixed location on ground level. The transmitting device is moved around either manually or on the top of a car to different locations in the campus area spanning 0.02 sq. mi. For each location, a random spreading factor and a random bandwidth are chosen to transmit data. The GPS coordinates of the location and the configuration used are manually recorded. Data are collected for a total of 16 positions on campus.

Benchtop Data Collection: To replicate large distance outdoor experiments, a benchtop experiment setup was used to create a controlled dataset with varying RSSI (receiver signal strength indicator). In this setup, the transmitting device and receiving device are connected directly over a wire. A variable attenuator is used to attenuate the transmitted signal using attenuation ranging from 40-140 dB for each symbol classification.

Baseline: A baseline based on the cross-correlation operation is used. An example set that contains one example signal for each class (pair of bandwidth and spreading factor) is used. For a given signal input, S, $f_{S,E_i}(n)$ is the cross-correlation of S with example $E_i$ in class i. Then the similarity score for the class i is computed as $$\text{score}(i) = \max_n f_{S,E_i}(n)$$

Finally, the class with the maximum score is assigned to this input. It will be appreciated that this is a computationally intensive process. Cross-correlation is an O(N log(N)) operation, where N is the length of the signal, and needs to be performed for each class.

6.2 Accuracy Evaluation

First, accuracy is evaluated of the CNN of the wireless networking system 100 in identifying the correct configuration for a packet. As previously described, for the CNN of the wireless networking system, the raw signal is captured for 4 ms and is used as input for the binary classier. If the received packet is in the low bandwidth category the signal capture is increased to 65 ms, otherwise it remains the same for high bandwidths. This is equivalent to two chirp (or symbol) durations for the highest data rate in the experiments (bandwidth 500 kHz and spreading factor 10) and about ⅙ of a chirp duration for the lowest data rate. The performance of the neural network is evaluated by analyzing accuracy for all three scenarios described previously. Due to the limitation, the analysis uses a mix of indoor and benchtop data for training the network. 30 percent of the collected data is used for training and all the other data is used for testing.

Figure 13:
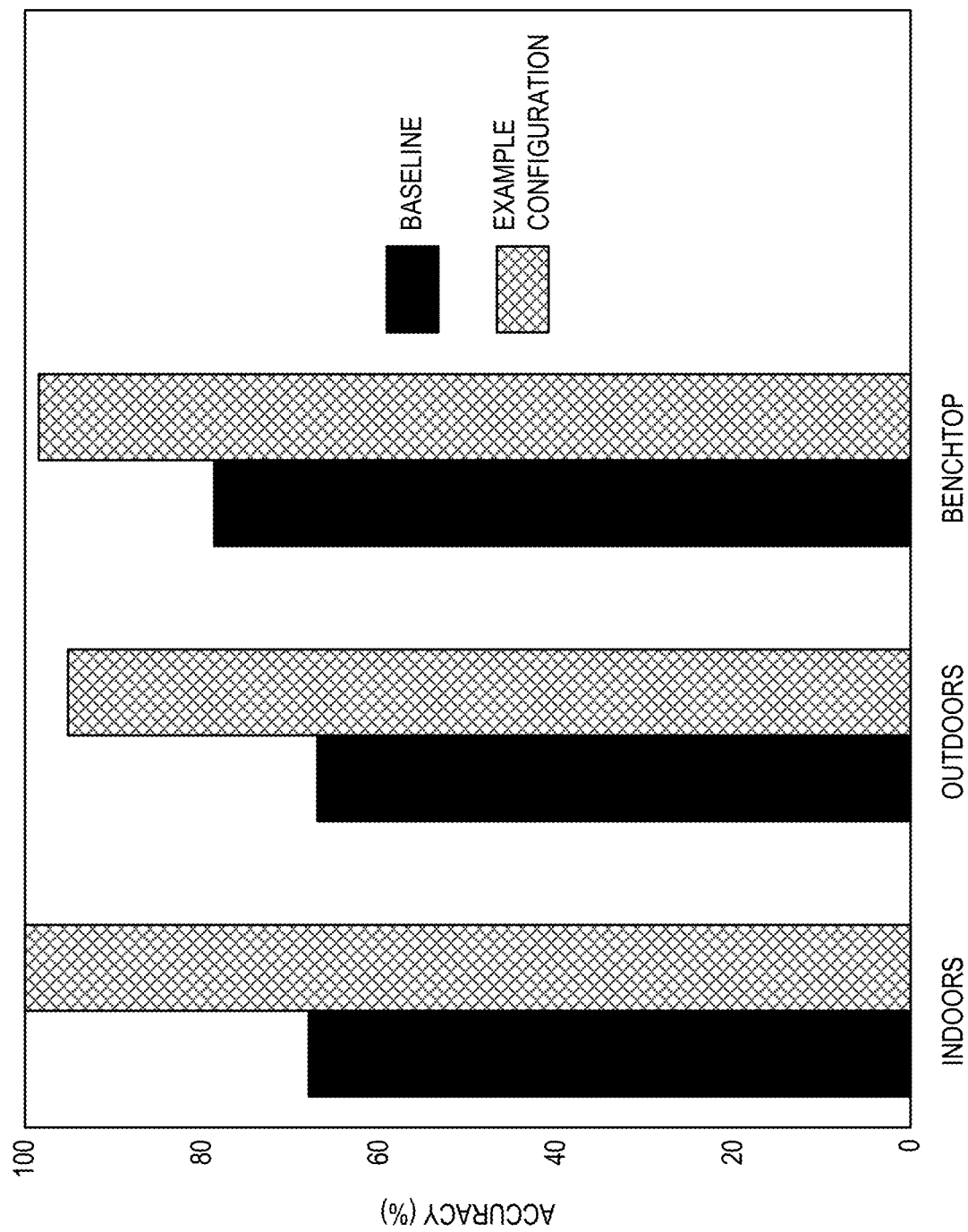
FIG. 13 shows graphs depicting accuracy of the wireless networking system of FIG. 1 and the accuracy of another system.

Turning now to FIG. 13, accuracy of the wireless networking system 100 will be described. As shown in the figure, the wireless networking system's 100 CNN achieves a very high overall accuracy of 99.8%, 95%, and 98.2% for indoor, outdoor, and benchtop evaluations respectively. This high accuracy demonstrates the feasibility of the wireless networking system's 100 core idea, i.e. that the correct configuration for a packet at the gateway can be identified with high accuracy. In comparison, the baseline performs significantly worse. For the three settings, the baseline accuracy is 67.5%, 67%, and 78% respectively. One reason for the baseline's worse performance is the challenge of identifying small differences in frequency bandwidth like 10.4 kHz and 15.6 kHZ. Unlike the higher bandwidths like 125 kHz and 250 kHz, these bandwidths are relatively close and the presence of noise and multipath makes it challenging to differentiate them.

Variation Across Environments.

FIG. 13 also demonstrates variation across environments. The system performs better outdoors than indoors. This is mainly because outdoor environments comprise more free space and less multipath fading compared to indoor environments. Indoor environments on the other hand have much more multipath reflections and makes them more challenging.

Variation Across Bandwidths.

Figure 14A:
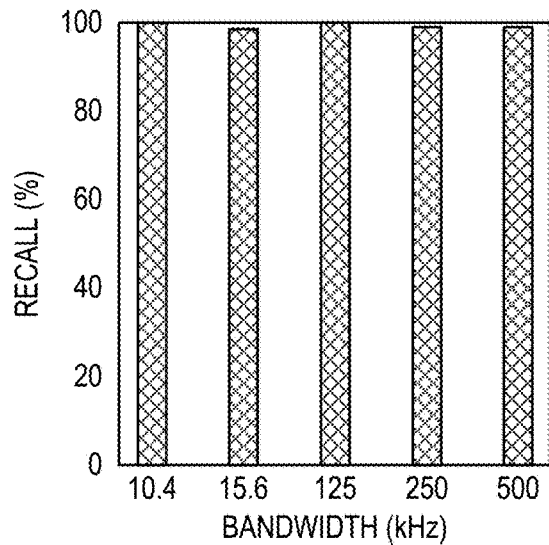
FIGS. 14A-14D show graphs depicting the accuracy of the wireless networking system of FIG. 1 across varying bandwidths, spreading factors, and locations.

FIG. 14A shows performance of the wireless networking system 100 across different bandwidths. For this experiment, recall is reported since it is more meaningful. Recall is the number of points correctly classified as bandwidth B divided by the number of points that were actually transmitted at bandwidth B. As shown in the figure, the recall remains around 99% for all bandwidths with the lowest being 98.4% (for 15.6 kHz) and the highest being close to 100% for 10.4 and 125 kHz.

Variation Across Spreading Factor.

Figure 14B:
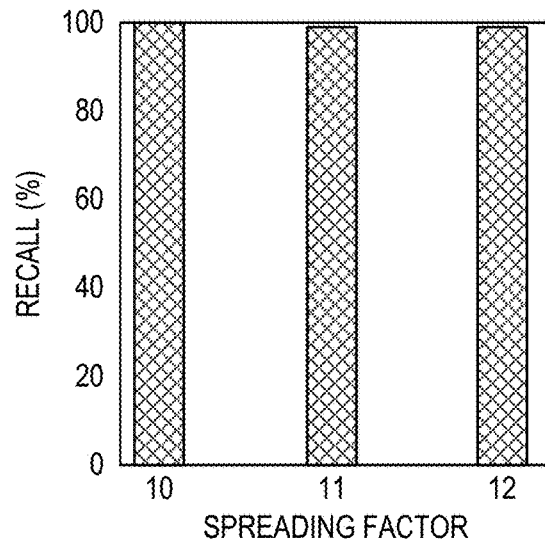

FIG. 14B plots the variation in performance of the wireless networking system 100 over different spreading factors. As shown in the figure, the recall remains around 99% for all the three spreading factors. The recall is slightly lower for the highest spreading factor. This is mainly because the highest spreading factor corresponds to the maximum time for each chirp. This means that if sampling occurs at a fixed duration of time, as it does for the inputs, the smallest fraction of the chirp for the highest spreading factor is obtained. This makes the classification problem more challenging as the spreading factor goes up. Nevertheless, the wireless networking system achieves over 95% accuracy even at the highest spreading factor used by LoRa by using less than half-percent of a single chirp-duration. This demonstrates the strong performance of the wireless networking system's CNN design.

Variation Across Location.

Figure 14C:
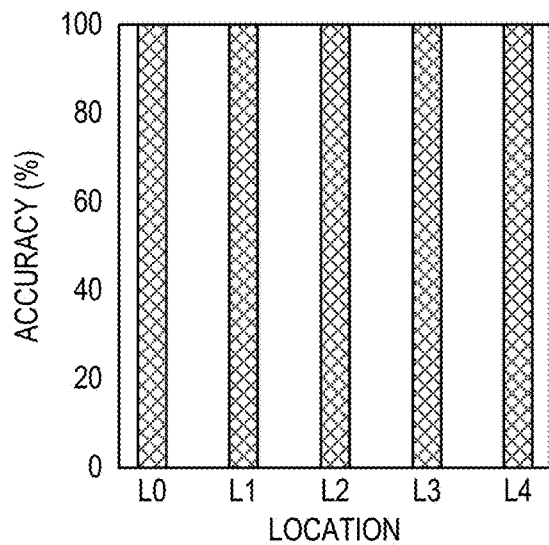

FIG. 14C plots the variation in performance of the wireless networking system 100 in different physical spaces. L0 to L4 denote four different locations. In each of these locations, the accuracy of the wireless networking system 100 remains consistent being around 99-100%.

Variation Across Time.

Figure 14D:
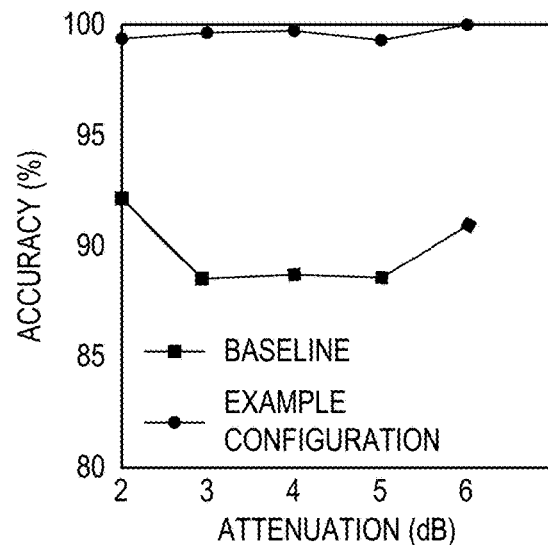

FIG. 14D plots the variation in performance of the wireless networking system 100 over time for all 15 classes. In this experiment data was collected over the air for 30 minutes for 5 consecutive days. As shown in the figure, the accuracy remains almost 100% for all days. When comparing to the baseline approach, there is a significant drop to around 88% accuracy.

A significant finding from the accuracy analysis is that the wireless networking system 100 is capable of correctly identifying radio configurations in a diverse set of scenarios with high accuracy. The wireless networking system achieves an overall accuracy of 97.7% which translates a packet loss of less than ¹⁄₂₀ packets lost. This loss becomes inconsequential when considering the overall packet loss for LoRa. Packet loss for a bandwidth of 125 kHz and spreading factor of 12 can range from 12% to 74% from distances of 0-15 km in an outdoor urban scenario. It is believed that the additional loss that the wireless networking system 100 introduces ends up being a reasonable trade-off for enabling automated radio configurations.

6.3 Generalization

One question that arises for most machine learning frameworks is their ability to generalize to new environments unseen in the training set. That question is addressed for the wireless networking system using two empirical evaluations.

First, the model is trained while excluding two locations from the training data (different rooms in the indoor environment). Specifically, data obtained from L5 and L6 are excluded from the training set. The data from these two locations is set apart for a test set. This allows testing of generalization to new environments. The result of this experiment is plotted in FIG. 15A. As shown in the figure, the localization accuracy suffers a minor drop from 98.9% to 94.5%.

Second, the model is tested for generalization across time. Test data is collected on a day that has not been included in the training set (and is set apart by a week). The model maintains the performance it achieved on prior days (97% accuracy). This shows that there exists some inter-location variation in accuracy, but temporal variation was not observed. The key takeaway from this result is that the wireless networking system is able to achieve high accuracy even for input signals of scenarios the CNN has not encountered. This indicates that the wireless networking system's CNN can be used for a diverse set of LoRa networks.

6.4 Sensitivity

Figure 15C:
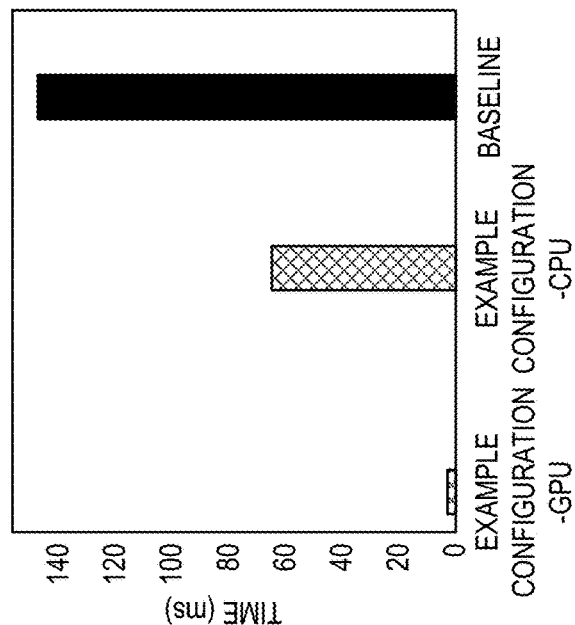
FIGS. 15A-15C show graphs depicting the accuracy of the wireless networking system of FIG. 1 across varying locations and time.
Figure 15B:
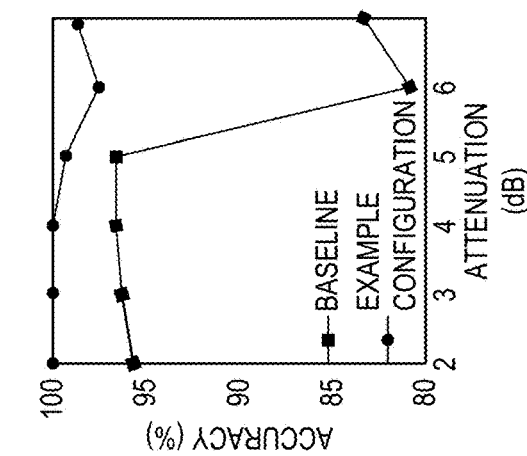
Figure 15A:

LoRa can operate at sensitivity ranging from −149 to −118 dBm depending on the SF and BW settings used. In order for the wireless networking system 100 to be valuable for LoRa network deployments, it also must be able to achieve high accuracy at the same range of sensitivity. To evaluate the accuracy of the CNN of the wireless networking system 100 for signals with low power, a dataset is generated that has been attenuated from 40-140 dB and the accuracy of the model is analyzed. FIG. 15B shows the accuracy of the model as a function of attenuation for the wireless networking system 100 and the baseline method. The wireless networking system 100 has an average accuracy of 96.7% and maximum of 99%, regardless of attenuation. This is consistent with accuracy achieved on the overall benchtop experiment reported in FIG. 13. On the other hand, the accuracy of the baseline method fluctuates and has a decline for signals exposed to high amounts of attenuation. The overall results indicate that the wireless networking system 100 is robust towards variation in signal strength and in turn should be able to maintain prediction accuracy for the signal conditions LoRa may face.

6.5 Latency

Minimizing latency of the wireless networking system 100 is crucial in maintaining real-time predictions. As discussed above, it was determined that five extra symbols can be added to the preamble 107A1 of LoRa packet transmissions that can be allocated towards The wireless networking system 100 to detect, classify, and update radio configurations at the base station device 102. This translates to a time duration ranging from 0.01 s-1.92 s. The wireless networking system 100 uses a maximum of two symbols per class (less than one symbol for most classes), the remaining time can be used for classification and parameter configuration. The latency of the CNN of the wireless networking system 100 is evaluated and compared to the baseline method. FIG. 13C shows the comparison of latency between the two methods. It will be appreciated that to perform classification the wireless networking system 100 takes approximately 60 ms per sample using a CPU and latency is improves by 20× when using the notebook-version NVIDIA GTX 1050 GPU, taking about 3 ms per sample. The baseline method has a compute time of 140 ms per sample, making it impossible to classify in real time for most LoRa encoding parameter configurations.

Section 7: System Summary

Described in this disclosure is a new gateway design that allows wireless devices 101 using LoRa and other protocols to transmit at their data rate of choice. This enables base station devices 102 to support mobile wireless devices 101 at large-scale over long-ranges, for example, without having to compromise overall network performance. The wireless networking system 100 uses a CNN to predict the bandwidth and spreading factor of packets transmitted by wireless devices 101 and enable the base station device 102 to decode packets across varying signal encoding parameter settings, to thereby quickly configure the radio 106 of the base station device 102 to properly receive a remainder 107A2 of an incoming packet transmission signal 107A based solely on information from the first two symbols from the preamble 107A1, in one example.

Test implementations of the wireless networking system 100 have included the following component features.

Classifier for LoRa Radio Configurations

A neural network is implemented that can classify 15 different LoRa radio configurations with 99.8% and 95% accuracy for indoor and outdoor scenarios, according to test results.

Real-Time Classification

Test demonstrates that radio configurations can be automated and performed in real time by exploiting the dynamic preamble settings of LoRa packets. The wireless networking system 100 relies on up to two preamble symbols to perform classification with high accuracy across a diverse set of scenarios.

Adaptive Sampling

Adaptive sampling is implemented to optimize the trade-off between sensitivity, accuracy, and latency of the network. The wireless networking system 100 adapts the bandwidth and capture duration to classify the vast set of radio configuration supported by LoRa.

Although a specific application of the disclosed wireless networking system 100 is described here, it will be appreciated that the wireless networking system may be used for other applications. Example of such applications are described below.

Rate Adaption

The wireless networking system 100 can be used to improve rate adaption techniques for LoRa. Since clients are able to configure their own encoding parameters and the wireless networking system 100 can autoconfigure the base station device 102 to follow suit, much of the typical overhead can be avoided. For instance, control messaging between a base and client can be minimized. Developing new protocols built upon the wireless networking system 100 for rate adaption has the potential to further boost the performance and efficiency of LPWANs.

Field-Programmable Gate Array Implementation.

While not shown in the figures, implementing the wireless networking system 100 on a field-programmable gate array (FPGA) is a possibility. FPGAs offer faster performance in comparison to other hardware compute platforms and also provide the flexibility to support different algorithms, logic, and memory resources. Such an implementation can help improve the latency of the wireless networking system 100 by minimizing the time duration need to detect, classify, and update radio parameters.

Alternative Hardware

While the described system is developed as a gateway augmented with a software defined radio, some off-the-shelf gateways like SX1257 support access to the raw IQ samples of the signal and will be compatible with the design.

Network Pruning

In relation to improving latency, pruning the network used by the wireless networking system 100 is a promising approach. The idea behind network pruning is that with the many parameters in the network, there are bound to be some that are redundant and have insignificant contribution. This minimizes the size of the network and in turn optimizes the time needed to perform classification.

As 5G standards are getting finalized, there is increasing interest in defining 6G networks—with a goal of providing an order of magnitude improvement in bandwidth and latency compared to 5G. A promising approach being explored is machine learning, and how devices can automatically reconfigure to communicate with devices, including those using other standards. This can significantly reduce control overhead, resulting in increased network capacity.

The wireless networking system 100 architecture is a step towards this vision—of complete interoperability, while still maintaining backwards compatibility with legacy devices. Thus, the systems and methods described herein are believed applicable to future protocols, including future high-speed wireless communications protocols such as the emerging 6G protocols.

Figure 16A:
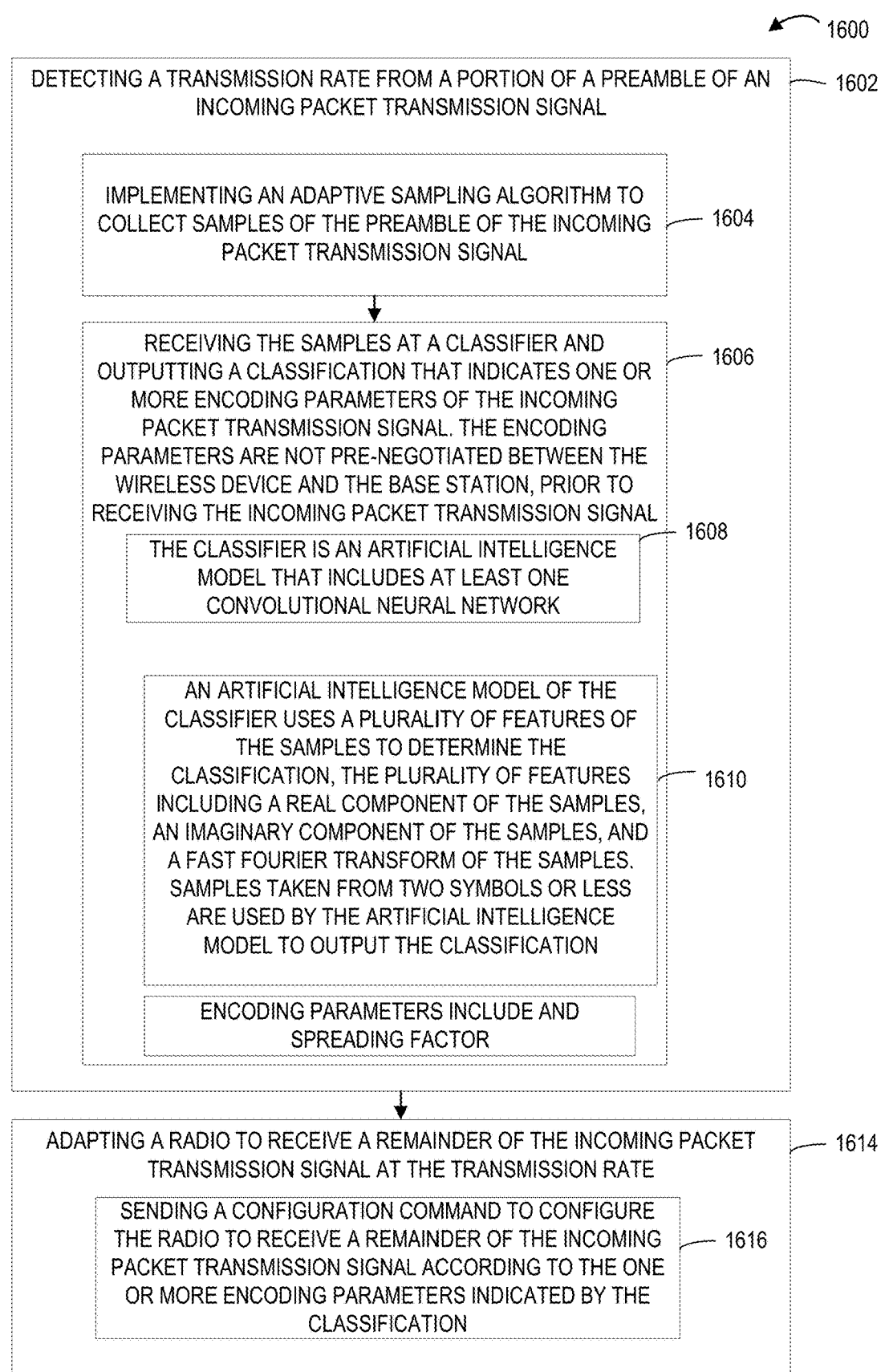
FIGS. 16A-16B illustrate a flowchart of a method, according to an embodiment of the present disclosure.

Now turning to FIG. 16A, a wireless networking method will now be described. A wireless networking method 1600 is provided. As illustrated, at 1602, the method in one embodiment comprises detecting a transmission rate from a portion of a preamble of an incoming packet transmission signal, and at 1614, the method further comprises adapting a radio to receive a remainder of the incoming packet transmission signal at the transmission rate. Further details of the method are provided below.

The method further comprises at 1604, via processing circuitry, implementing an adaptive sampling algorithm to collect samples of the preamble of the incoming packet transmission signal. The processing circuitry may be included in a base station equipped with a radio configured to receive and transmit wireless signals. In this embodiment, the wireless signals are received and transmitted according to LoRa networking protocol, although in other embodiments, other networking protocols may be used. For example, other suitable low power or long range networking protocols in which the length of the data symbols in transmissions signals varies greatly may benefit from the application of this method. The incoming packet transmission signal is received from a wireless device. Although the method of this embodiment describes the incoming packet transmission signal being received from one wireless devices, it will be appreciated that this method is suitable for receiving incoming packet transmission signals from a plurality of wireless devices. For example, tens, hundreds, or even thousands of wireless devices may be used.

At 1606, the method further comprises receiving the samples at a classifier and outputting a classification that indicates one or more encoding parameters of the incoming packet transmission signal. The encoding parameters are not pre-negotiated between the wireless device and the base station, prior to receiving the incoming packet transmission signal. A benefit of the encoding parameters not being pre-negotiated is that a client device sending the incoming packet transmission signal can be used as is. In other words, the method described here requires no modification of the client device. In this method, the one or more encoding parameters include bandwidth and/or spreading factor, although other suitable encoding parameters may be used.

At 1608, in one example configuration of the method, the classifier is an artificial intelligence model that includes at least one convolutional neural network. Details of the artificial intelligence model are shown in FIG. 16B and will be described in a below.

At 1610, the samples include samples taken from two symbols in a preamble of the packet signal, and an artificial intelligence model of the classifier uses a plurality of features of the samples to determine the classification, the plurality of features including a real component of the samples, an imaginary component of the samples, and a fast Fourier transform (FFT) of the samples. Using data from both the time and frequency domain of the signal is crucial in achieving high prediction accuracy. For example, if only the FFT of each signal were used, distinguishing between very low BW settings would be difficult. Supplementing the FFT with features from the time domain helps catch the variation in the frequency of oscillation of a preamble symbol, while the FFT helps provides insights on bandwidth variation. By using features in both the time and frequency domain of a signal, samples taken from two symbols or less are used by the artificial intelligence model to output the classification.

At 1616, the method comprises sending a configuration command to configure a radio to receive a remainder of the incoming packet transmission signal according to the one or more encoding parameters indicated by the classification. In this way, the remainder of the incoming packet transmission signal can be received by the radio.

Figure 16B:
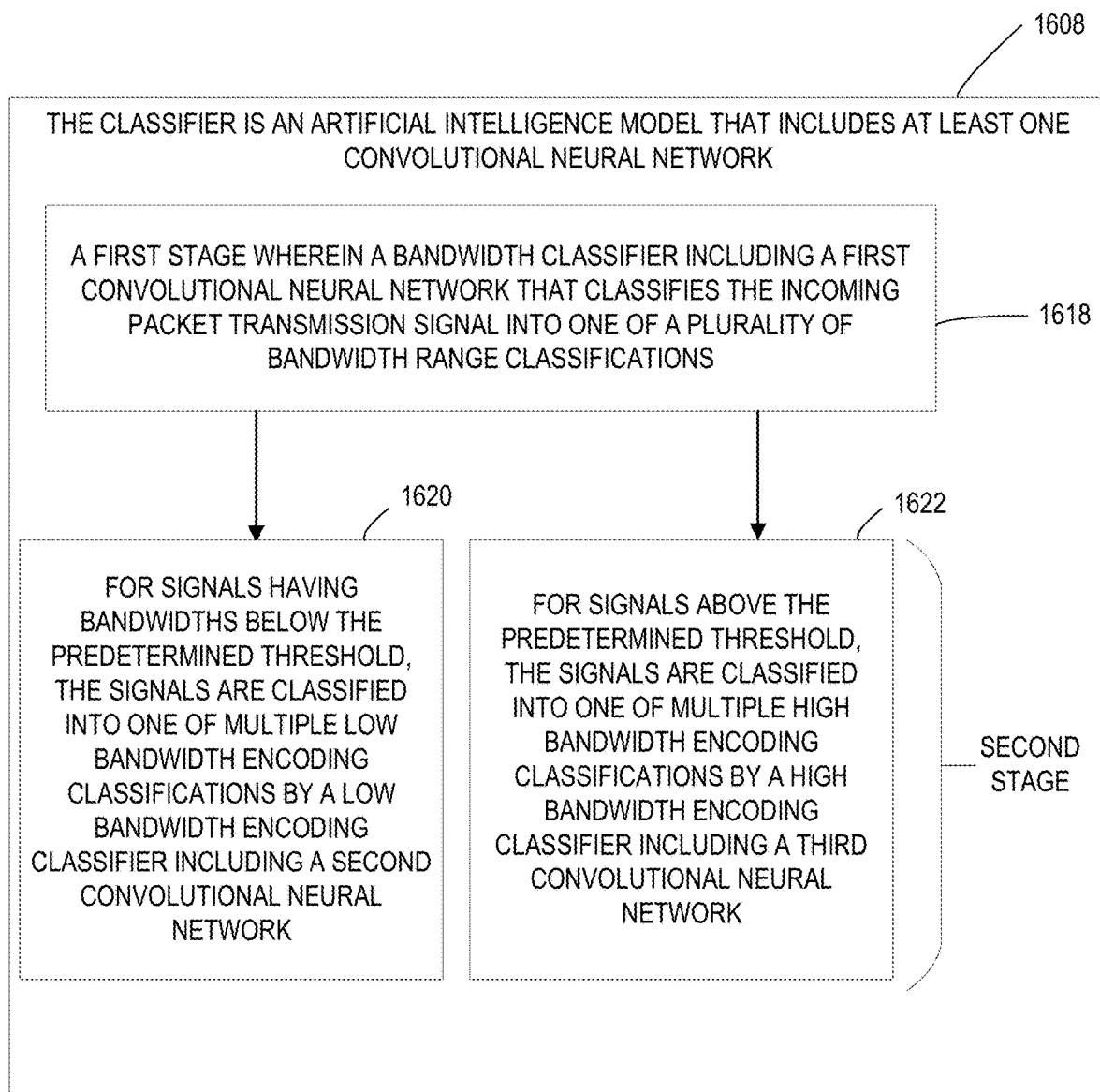

Turning now to FIG. 16B, further details of 1608 are provided. At 1618, the artificial intelligence model is a multi-stage model and includes a first stage wherein a bandwidth classifier including a first convolutional neural network that classifies the incoming packet transmission signal into one of a plurality of bandwidth range classifications. In this example, the bandwidth classifier including the first convolution neural network uses the real component, the imaginary component and the FFT of the incoming packet transmission signal, each split into ten 20 kHz chunks. However, in other examples, two, four, six, eight, or any suitable number of chunks may be used. In the first stage of this example, the incoming packet transmission signal is classified into one of two bandwidth range classifications, but three, four, or any other suitable number may be used.

At 1620, at a second stage wherein, for signals having bandwidths below the predetermined threshold, the signals are classified into one of multiple low bandwidth encoding classifications by a low bandwidth encoding classifier including a second convolutional neural network.

At 1622, for signals above the predetermined threshold, the signals are classified into one of multiple high bandwidth encoding classifications by a high bandwidth encoding classifier including a third convolutional neural network.

In some embodiments, the methods and processes described herein may be tied to a computing system of one or more computing devices. In particular, such methods and processes may be implemented as a computer-application program or service, an application-programming interface (API), a library, and/or other computer-program product.

Figure 17:
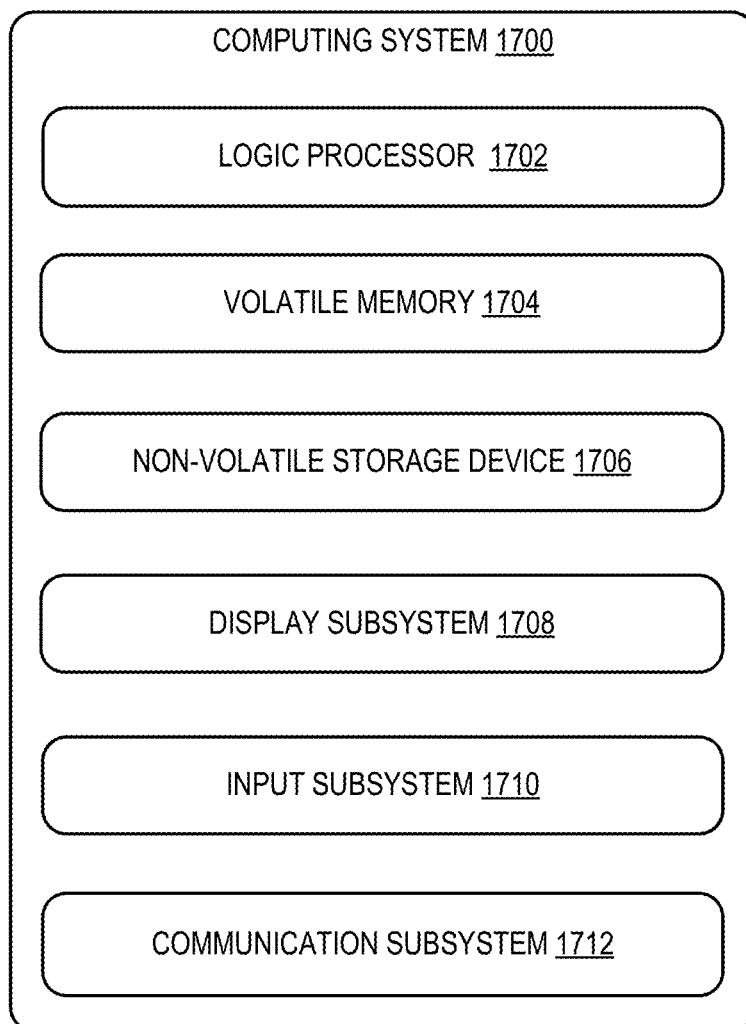
FIG. 17 illustrates an exemplary computer environment in which the system of FIG. 1 may be implemented.

FIG. 17 schematically shows a non-limiting embodiment of a computing system 1700 that can enact one or more of the methods and processes described above. Computing system 1700 is shown in simplified form. Computing system 1700 may embody wireless device 101, base station device 102 and/or remote devices described above and illustrated in FIG. 1. Computing system 1700 may take the form of one or more personal computers, server computers, tablet computers, home-entertainment computers, network computing devices, gaming devices, mobile computing devices, mobile communication devices (e.g., smart phone), IoT devices, remote sensor devices, and/or other computing devices.

Computing system 1700 includes a logic processor 1702 volatile memory 1704, and a non-volatile storage device 1706. Computing system 1700 may optionally include a display subsystem 1708, input subsystem 1710, communication subsystem 1712, and/or other components not shown in FIG. 17.

Logic processor 1702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1706 includes one or more physical devices configured to hold instructions executable by the logic processors to implement the methods and processes described herein. When such methods and processes are implemented, the state of non-volatile storage device 1706 may be transformed—e.g., to hold different data.

Non-volatile storage device 1706 may include physical devices that are removable and/or built-in. Non-volatile storage device 1706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1706 may include nonvolatile, dynamic, static, read/write, read-only, sequential-access, location-addressable, file-addressable, and/or content-addressable devices. It will be appreciated that non-volatile storage device 1706 is configured to hold instructions even when power is cut to the non-volatile storage device 1706.

Volatile memory 1704 may include physical devices that include random access memory. Volatile memory 1704 is typically utilized by logic processor 1702 to temporarily store information during processing of software instructions. It will be appreciated that volatile memory 1704 typically does not continue to store instructions when power is cut to the volatile memory 1704.

Aspects of logic processor 1702, volatile memory 1704, and non-volatile storage device 1706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1700 typically implemented in software by a processor to perform a particular function using portions of volatile memory, which function involves transformative processing that specially configures the processor to perform the function. Thus, a module, program, or engine may be instantiated via logic processor 1702 executing instructions held by non-volatile storage device 1706, using portions of volatile memory 1704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1708 may be used to present a visual representation of data held by non-volatile storage device 1706. The visual representation may take the form of a graphical user interface (GUI). As the herein described methods and processes change the data held by the non-volatile storage device, and thus transform the state of the non-volatile storage device, the state of display subsystem 1708 may likewise be transformed to visually represent changes in the underlying data. Display subsystem 1708 may include one or more display devices utilizing virtually any type of technology. Such display devices may be combined with logic processor 1702, volatile memory 1704, and/or non-volatile storage device 1706 in a shared enclosure, or such display devices may be peripheral display devices.

When included, input subsystem 1710 may comprise or interface with one or more user-input devices such as a keyboard, mouse, camera, microphone, touch pad, finger operable pointer device, touch screen, or game controller.

When included, communication subsystem 1712 may be configured to communicatively couple various computing devices described herein with each other, and with other devices. Communication subsystem 1712 may include wired and/or wireless communication devices compatible with one or more different communication protocols, including low power long range wireless protocols such as LoRaWAN as described above. As non-limiting examples, the communication subsystem may be configured for communication via a wireless telephone network, or a wired or wireless local- or wide-area network. In some embodiments, the communication subsystem may allow computing system 1700 to send and/or receive messages to and/or from other devices via a network such as the Internet.

The following paragraphs provide additional description of the subject matter of the present disclosure. According to one aspect, a wireless networking system, is provided that comprises a base station device including processing circuitry configured to detect a transmission rate from a portion of a preamble of an incoming packet transmission signal and adapt a radio configuration to receive a remainder of the incoming packet transmission signal at the transmission rate.

In this aspect, the base station device may further include a packet detection module that implements an adaptive sampling algorithm to collect samples of the preamble of the incoming packet transmission signal. The incoming packet transmission signal has been received by a receiver of the base station device from a wireless device. The base station device may further include a classifier configured to receive the samples and to output a classification that indicates one or more encoding parameters of the incoming packet transmission signal. The base station device may further include and a radio configuration module that sends a configuration command to configure a radio of the base station device to receive a remainder of the incoming packet transmission signal according to the one or more encoding parameters indicated by the classification.

In this aspect, the encoding parameters may not be pre-negotiated between the wireless device and the base station device, prior to receiving the incoming packet transmission signal.

In this aspect, the wireless device may be further configured to set the encoding parameters to values selected at the wireless device from among a plurality of preset values for the encoding parameters, and commence transmitting the incoming packet transmission signal according to the encoding parameters without engaging in any prior communications with the base station device to pre-negotiate the encoding parameters.

In this aspect, the samples may include samples taken from two symbols in a preamble of the packet signal, and an artificial intelligence model of the classifier uses a plurality of features of the samples to determine the classification, the plurality of features including a real component of the samples, an imaginary component of the samples, and a fast Fourier transform of the samples.

In this aspect, samples taken from two symbols or less may be used by the artificial intelligence model to output the classification.

In this aspect, the one or more encoding parameters may include bandwidth and/or spreading factor.

In this aspect, the adaptive sampling algorithm may be further configured to filter the incoming packet transmission signal using one or more band pass filters to thereby generate a plurality of filtered incoming packet transmission signal components, and determine that the captured signal is sufficient to determine the one or more encoding parameters for one of the filtered incoming packet transmission signal components.

In this aspect, the classifier may include an artificial intelligence model that includes at least one convolutional neural network.

In this aspect, the artificial intelligence model may be a multi-stage model and include a first stage wherein a bandwidth classifier including a first convolutional neural network that classifies the incoming packet transmission signal into one of a plurality of bandwidth range classifications, and a second stage wherein, for signals having bandwidths below the predetermined threshold, the signals are classified into one of multiple low bandwidth encoding classifications by a low bandwidth encoding classifier including a second convolutional neural network, and for signals above the predetermined threshold, the signals are classified into one of multiple high bandwidth encoding classifications by a high bandwidth encoding classifier including a third convolutional neural network.

In this aspect, the base station device may be configured to implement a low power wide area network and the incoming packet transmission signal is sent from the wireless device to the base station device according a LoRaWAN communication protocol.

According to another aspect, a wireless networking method is provided comprising detecting a transmission rate from a portion of a preamble of an incoming packet transmission signal, and adapting a radio to receive a remainder of the incoming packet transmission signal at the transmission rate.

In this aspect, the method may further comprise, via processing circuitry, implementing an adaptive sampling algorithm to collect samples of the preamble of the incoming packet transmission signal, the incoming packet transmission signal being received from a wireless device, receiving the samples at a classifier and outputting a classification that indicates one or more encoding parameters of the incoming packet transmission signal, and sending a configuration command to configure the radio to receive a remainder of the incoming packet transmission signal according to the one or more encoding parameters indicated by the classification.

In this aspect, the encoding parameters may not be pre-negotiated between the wireless device and the base station device, prior to receiving the incoming packet transmission signal.

In this aspect, the samples may include samples taken from two symbols in a preamble of the packet signal, and an artificial intelligence model of the classifier uses a plurality of features of the samples to determine the classification, the plurality of features including a real component of the samples, an imaginary component of the samples, and a fast Fourier transform of the samples.

In this aspect, the samples may be taken from two symbols or less are used by the artificial intelligence model to output the classification.

In this aspect, the one or more encoding parameters may include bandwidth and/or spreading factor.

In this aspect, the classifier may be an artificial intelligence model that includes at least one convolutional neural network.

In this aspect, the artificial intelligence model may be a multi-stage model and includes a first stage wherein a bandwidth classifier including a first convolutional neural network that classifies the incoming packet transmission signal into one of a plurality of bandwidth range classifications, and a second stage wherein, for signals having bandwidths below the predetermined threshold, the signals are classified into one of multiple low bandwidth encoding classifications by a low bandwidth encoding classifier including a second convolutional neural network, and for signals above the predetermined threshold, the signals are classified into one of multiple high bandwidth encoding classifications by a high bandwidth encoding classifier including a third convolutional neural network.

According to another aspect, a wireless networking system is provided, comprising processing circuitry configured to execute a packet detection module that implements an adaptive sampling algorithm to collect samples of a preamble of an incoming packet transmission signal, the incoming packet transmission signal being received by a receiver from a wireless device. The wireless networking system may be further configured to execute a classifier including a neural network configured to receive the samples and to output a classification that indicates one or more encoding parameters of the incoming packet transmission signal. The wireless networking system may be further configured to execute a radio configuration module that sends a configuration command to configure an associated radio to receive a remainder of the incoming packet transmission signal according to the one or more encoding parameters indicated by the classification.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A wireless networking system, comprising:
a base station device including processing circuitry configured to detect a transmission rate from a portion of a preamble of an incoming packet transmission signal and adapt a radio configuration to receive a remainder of the incoming packet transmission signal at the transmission rate, wherein the processing circuitry of the base station device includes:
a packet detection module that implements an adaptive sampling algorithm to collect samples of the preamble of the incoming packet transmission signal, the incoming packet transmission signal being received by a receiver of the base station device from a wireless device;
a classifier configured to receive the samples and to output a classification that indicates one or more encoding parameters of the incoming packet transmission signal; and
a radio configuration module that sends a configuration command to configure a radio of the base station device to receive a remainder of the incoming packet transmission signal according to the one or more encoding parameters indicated by the classification.

2. The wireless networking system of claim 1, wherein the base station device is configured to implement a low power wide area network and the incoming packet transmission signal is sent from the wireless device to the base station device according to a Long Range Wide Area Network (LoRaWAN) communication protocol.

3. The wireless networking system of claim 1, wherein the encoding parameters are not pre-negotiated between the wireless device and the base station device, prior to receiving the incoming packet transmission signal.

4. The wireless networking system of claim 1, wherein the wireless device is configured to:
set the encoding parameters to values selected at the wireless device from among a plurality of preset values for the encoding parameters, and
commence transmitting the incoming packet transmission signal according to the encoding parameters without engaging in any prior communications with the base station device to pre-negotiate the encoding parameters.

5. The wireless networking system of claim 1, wherein the samples include samples taken from two symbols in a preamble of the packet signal, and an artificial intelligence model of the classifier uses a plurality of features of the samples to determine the classification, the plurality of features including a real component of the samples, an imaginary component of the samples, and a fast Fourier transform of the samples.

6. The wireless networking system of claim 5, wherein samples taken from two symbols or less are used by the artificial intelligence model to output the classification.

7. The wireless networking system of claim 5, wherein the artificial intelligence model is a multi-stage model and includes:
a first stage wherein a bandwidth classifier including a first convolutional neural network that classifies the incoming packet transmission signal into one of a plurality of bandwidth range classifications; and
a second stage wherein, for signals having bandwidths below the predetermined threshold, the signals are classified into one of multiple low bandwidth encoding classifications by a low bandwidth encoding classifier including a second convolutional neural network, and for signals above the predetermined threshold, the signals are classified into one of multiple high bandwidth encoding classifications by a high bandwidth encoding classifier including a third convolutional neural network.

8. The wireless networking system of claim 1, wherein the adaptive sampling algorithm is configured to:
filter the incoming packet transmission signal using one or more band pass filters to thereby generate a plurality of filtered incoming packet transmission signal components;
determine that the captured signal is sufficient to determine the one or more encoding parameters for one of the filtered incoming packet transmission signal components.

9. The wireless networking system of claim 1, wherein the classifier is an artificial intelligence model that includes at least one convolutional neural network.

10. The wireless networking system of claim 1, wherein the one or more encoding parameters include bandwidth and/or spreading factor.

11. A wireless networking system, comprising:
processing circuitry configured to execute:
a packet detection module that implements an adaptive sampling algorithm to collect samples of a preamble of an incoming packet transmission signal, the incoming packet transmission signal being received by a receiver from a wireless device;
a classifier including a neural network configured to receive the samples and to output a classification that indicates one or more encoding parameters of the incoming packet transmission signal; and
a radio configuration module that sends a configuration command to configure an associated radio to receive a remainder of the incoming packet transmission signal according to the one or more encoding parameters indicated by the classification.

12. A wireless networking method, comprising:
detecting a transmission rate from a portion of a preamble of an incoming packet transmission signal, at least in part by:
implementing an adaptive sampling algorithm to collect samples of the preamble of the incoming packet transmission signal, the incoming packet transmission signal being received from a wireless device; and
receiving the samples at a classifier and outputting a classification that indicates one or more encoding parameters of the incoming packet transmission signal; and
adapting a radio to receive a remainder of the incoming packet transmission signal at the transmission rate, at least in part by:
sending a configuration command to configure the radio to receive a remainder of the incoming packet transmission signal according to the one or more encoding parameters indicated by the classification.

13. The method of claim 12, wherein the one or more encoding parameters include bandwidth and/or spreading factor.

14. The method of claim 12, wherein the encoding parameters are not pre-negotiated between the wireless device and the base station device, prior to receiving the incoming packet transmission signal.

15. The method of claim 12, wherein the samples include samples taken from two symbols in a preamble of the packet signal, and an artificial intelligence model of the classifier uses a plurality of features of the samples to determine the classification, the plurality of features including a real component of the samples, an imaginary component of the samples, and a fast Fourier transform of the samples.

16. The method of claim 15, wherein samples taken from two symbols or less are used by the artificial intelligence model to output the classification.

17. The method of claim 12, wherein the classifier is an artificial intelligence model that includes at least one convolutional neural network.

18. The method of claim 17, wherein the artificial intelligence model is a multi-stage model and includes:
- a first stage wherein a bandwidth classifier including a first convolutional neural network that classifies the incoming packet transmission signal into one of a plurality of bandwidth range classifications; and
- a second stage wherein, for signals having bandwidths below the predetermined threshold, the signals are classified into one of multiple low bandwidth encoding classifications by a low bandwidth encoding classifier including a second convolutional neural network, and for signals above the predetermined threshold, the signals are classified into one of multiple high bandwidth encoding classifications by a high bandwidth encoding classifier including a third convolutional neural network.

* * * * *